United States Patent
Lee et al.

(10) Patent No.: US 9,471,270 B2
(45) Date of Patent: Oct. 18, 2016

(54) MOBILE TERMINAL AND CONTROL METHOD FOR THE MOBILE TERMINAL

(71) Applicant: LG ELECTRONICS INC., Seoul (KR)

(72) Inventors: Younghak Lee, Seoul (KR); Inkwan Yeo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/581,959

(22) Filed: Dec. 23, 2014

(65) Prior Publication Data

US 2016/0026425 A1 Jan. 28, 2016

(30) Foreign Application Priority Data

Jul. 23, 2014 (KR) ........................ 10-2014-0093461

(51) Int. Cl.
| | |
|---|---|
| *G06F 3/14* | (2006.01) |
| *G06F 3/0488* | (2013.01) |
| *G06F 3/041* | (2006.01) |
| *H04M 1/725* | (2006.01) |

(52) U.S. Cl.
CPC ........... *G06F 3/1454* (2013.01); *G06F 3/0416* (2013.01); *G06F 3/0488* (2013.01); *G06F 3/1423* (2013.01); *H04M 1/72519* (2013.01)

(58) Field of Classification Search
CPC ...... G06F 21/31; G06F 21/44; G06F 21/445; G06F 21/45; G06F 21/46
See application file for complete search history.

(56) References Cited

U.S. PATENT DOCUMENTS

| | | |
|---|---|---|
| 2010/0001967 A1 | 1/2010 | Yoo |
| 2010/0162182 A1 | 6/2010 | Oh et al. |
| 2011/0282785 A1* | 11/2011 | Chin .................. G06F 3/04883 705/42 |
| 2014/0198070 A1 | 7/2014 | Won |
| 2014/0267108 A1* | 9/2014 | Chung ................. G06F 3/0416 345/173 |
| 2015/0058942 A1* | 2/2015 | Dermu ................. G06F 21/445 726/6 |

FOREIGN PATENT DOCUMENTS

| | | |
|---|---|---|
| KR | 10-2009-0123440 A | 12/2009 |
| KR | 10-2010-0020817 A | 2/2010 |
| KR | 10-2010-0073743 A | 7/2010 |
| KR | 10-1231513 B1 | 2/2013 |

* cited by examiner

*Primary Examiner* — Kevin M Nguyen
(74) *Attorney, Agent, or Firm* — Birch, Stewart, Kolasch & Birch, LLP

(57) ABSTRACT

A mobile terminal including a wireless communication unit configured to wirelessly communicate with an external device; a touch screen configured to sense a touch input, and switch between an active state and an inactive state; and a controller configured to receive a plurality of touch inputs applied to the touch screen in the inactive state, and when the received touch inputs satisfy a preset criteria, control the external device to release a locked state of the external device, activate a first region of the touch screen in the inactive state, and display screen information corresponding to the external device in the activated first region of the touch screen.

20 Claims, 26 Drawing Sheets

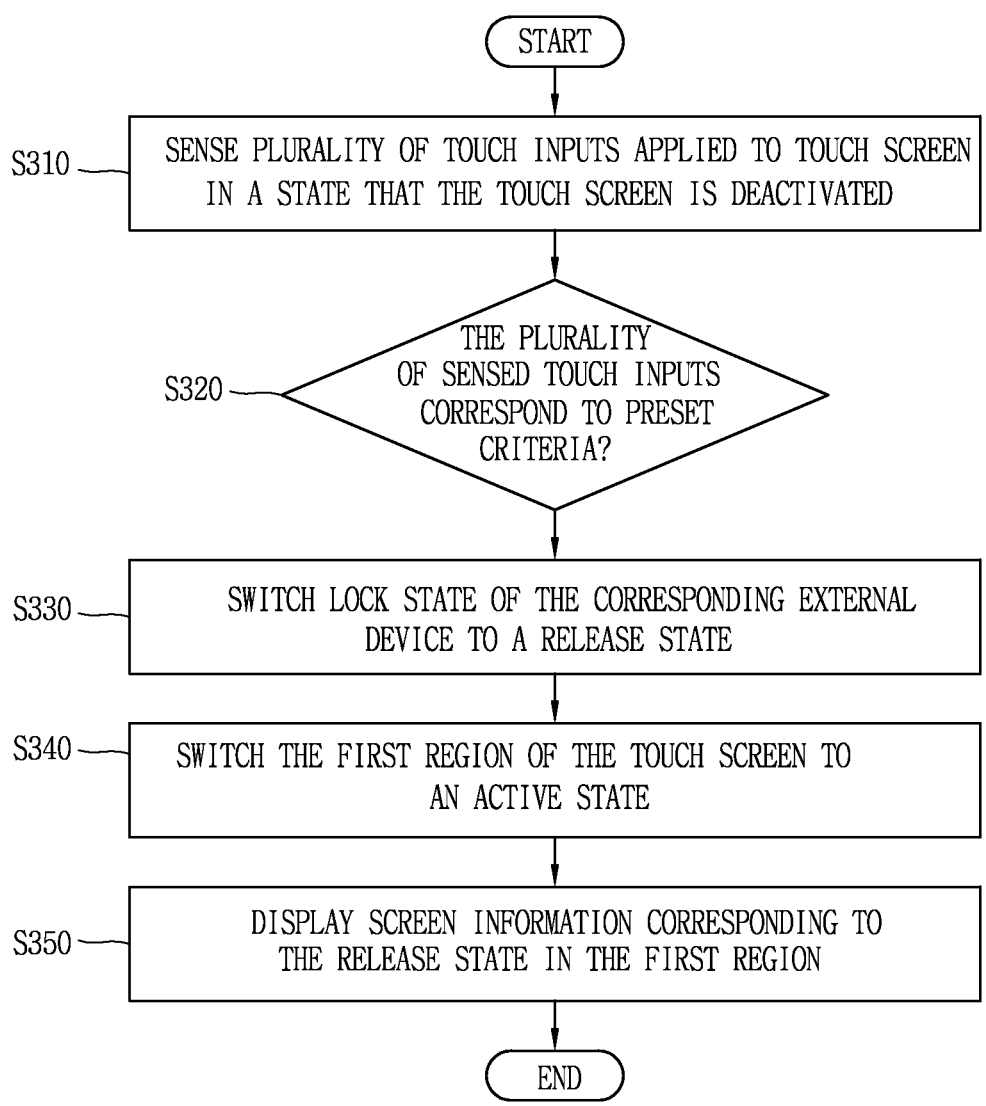

MOBILE TERMINAL AND CONTROL METHOD FOR THE MOBILE TERMINAL

CROSS-REFERENCE TO RELATED APPLICATIONS

This application claims priority to Korean Patent Application No. 10-2014-0093461 filed on Jul. 23, 2014 in Korea, the entire contents of which is hereby incorporated by reference in its entirety.

BACKGROUND OF THE INVENTION

1. Field of the Invention

The present invention relates to a mobile terminal capable of sensing a tap hitting the display unit and a control method thereof.

2. Background of the Invention

Terminals may be divided into mobile/portable terminals and stationary terminals. Also, mobile terminals may be classified into handheld terminals and vehicle mounted terminals. The mobile terminal can also capture still images or moving images, play music or video files, play games, receive broadcast and the like, so as to be implemented as an integrated multimedia player.

However, the battery supply is limited and the user interface is often cumbersome to use.

SUMMARY OF THE INVENTION

Accordingly, one aspect of the present invention is to provide a mobile terminal capable of applying a tap tapping an inactive display unit to control the operation of another terminal connected thereto and a control method thereof.

Another aspect of the present invention is to provide a mobile terminal capable of switching a lock state of another terminal to a release state using an operation pattern set through a user input and a control method thereof.

To achieve these and other advantages and in accordance with the purpose of the present invention, as embodied and broadly described herein, the present invention provides in one aspect a mobile terminal including a wireless communication unit configured to wirelessly communicate with an external device; a touch screen configured to sense a touch input, and switch between an active state and an inactive state; and a controller configured to receive a plurality of touch inputs applied to the touch screen in the inactive state, and when the received touch inputs satisfy a preset criteria, control the external device to release a locked state of the external device when the received touch inputs satisfy a preset criteria, activate a first region of the touch screen in the inactive state, and display screen information corresponding to the external device in the activated first region of the touch screen. The present invention also provides a corresponding method of controlling a mobile terminal.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings, which are given by illustration only, and thus are not limitative of the present invention, and wherein:

FIG. 3 is a flow chart representatively illustrating a control method of a mobile terminal according to an embodiment of the present invention;

DETAILED DESCRIPTION OF THE PREFERRED EMBODIMENTS

Description will now be given in detail according to the embodiments disclosed herein, with reference to the accompanying drawings. For the sake of brief description with reference to the drawings, the same or equivalent components will be provided with the same reference numbers, and description thereof will not be repeated. A suffix "module" and "unit" used for constituent elements disclosed in the following description is merely intended for easy description of the specification, and the suffix itself does not give any special meaning or function. The accompanying drawings are used to help easily understand the technical idea of the present invention and it should be understood that the idea of the present invention is not limited by the accompanying drawings. The idea of the present invention should be construed to extend to any alterations, equivalents and substitutes besides the accompanying drawings.

Mobile terminals described herein may include cellular phones, smart phones, laptop computers, digital broadcasting terminals, personal digital assistants (PDAs), portable multimedia players (PMPs), navigators, slate PCs, tablet PCs, ultra books, wearable devices (for example, smart watches, smart glasses, head mounted displays (HMDs)), and the like. However, the configuration according to the embodiments of this specification can also be applied to stationary terminals such as digital TV, desktop computers and the like, excluding a case of being applicable only to the mobile terminals.

Figure 1A:
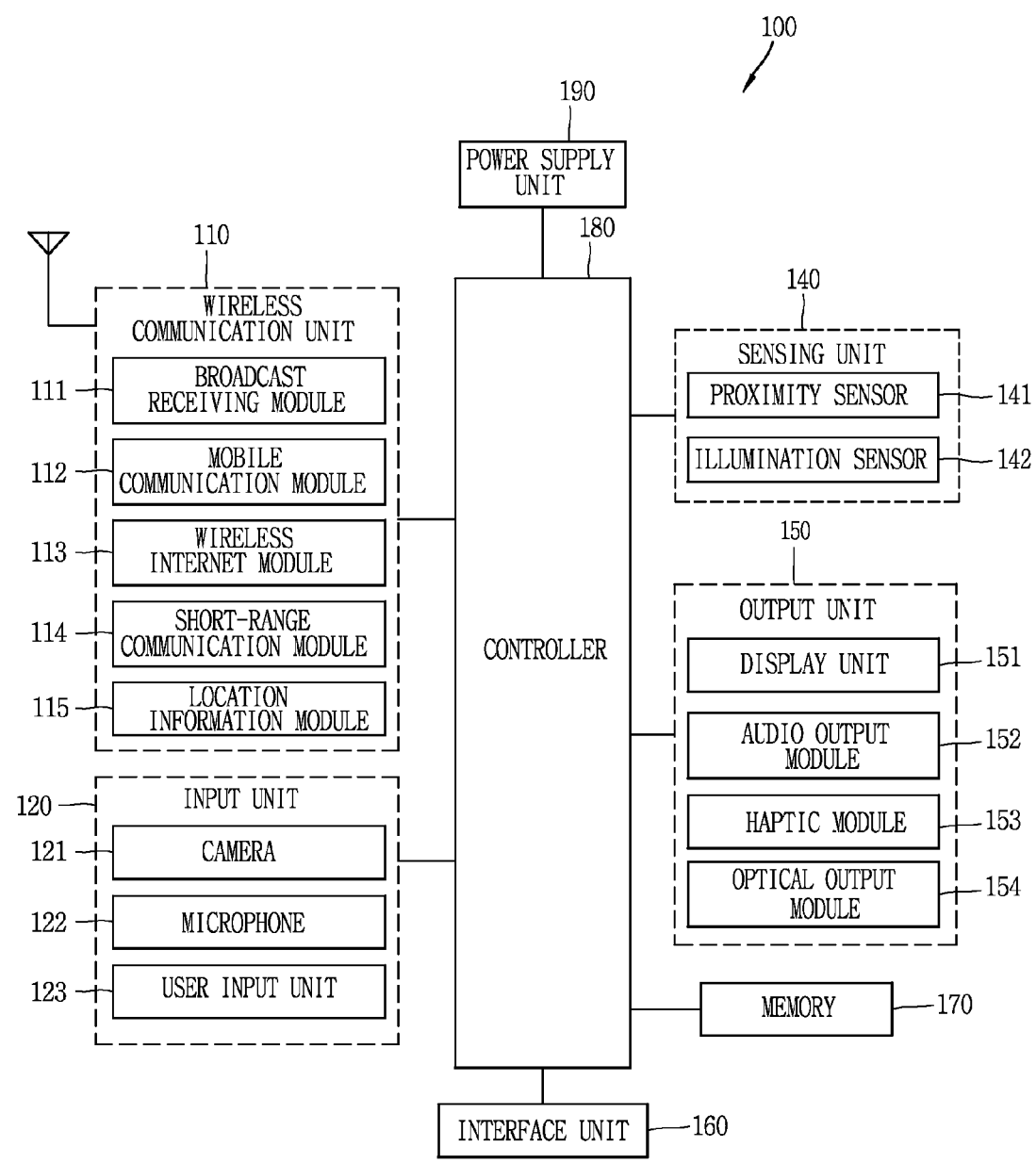
FIG. 1A is a block diagram illustrating a mobile terminal according to an embodiment of the present invention.
Figure 1B:
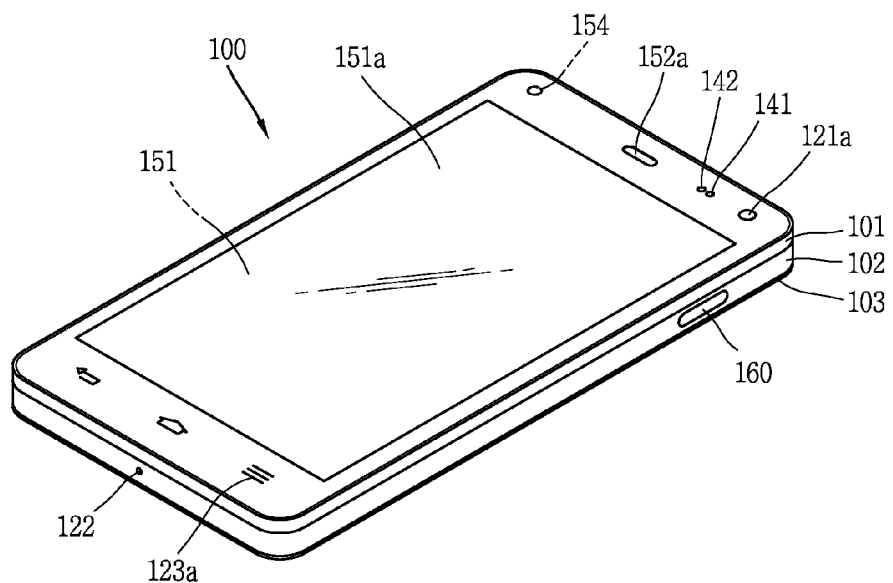
FIGS. 1B and 1C are conceptual views illustrating one example of the mobile terminal according to an embodiment of the present invention, viewed from different directions.
Figure 1C:
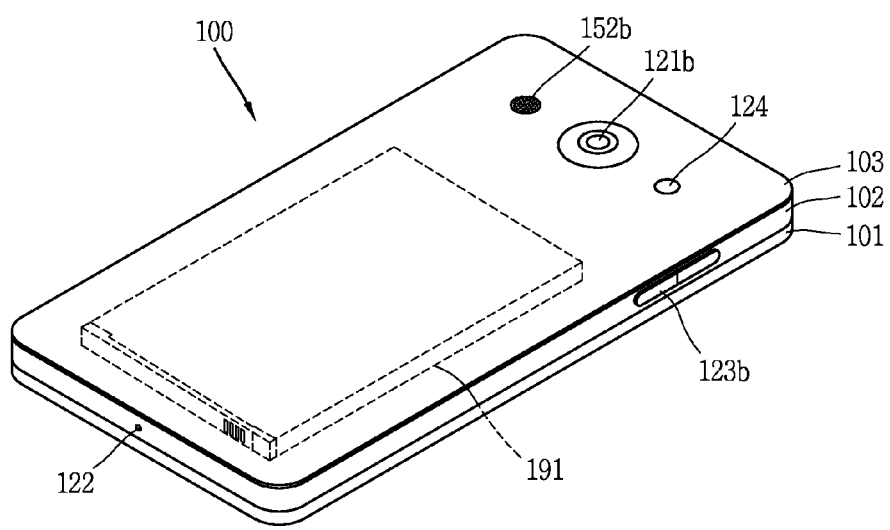

Referring to FIGS. 1A through 1C, FIG. 1A is a block diagram of a mobile terminal in accordance with the present invention, FIGS. 1B and 1C are conceptual views of one example of the mobile terminal, viewed from different directions. The mobile terminal 100 may include components, such as a wireless communication unit 110, an input unit 120, a sensing unit 140, an output unit 150, an interface unit 160, a memory 170, a controller 180, a power supply unit 190 and the like. FIG. 1A illustrates the mobile terminal having various components, but implementing all of the illustrated components is not a requirement. Greater or fewer components may alternatively be implemented.

In more detail, the wireless communication unit 110 may typically include one or more modules which permit wireless communications between the mobile terminal 100 and a wireless communication system, between the mobile terminal 100 and another mobile terminal 100, or between the mobile terminal 100 and a network within which another mobile terminal 100 (or an external server) is located.

For example, the wireless communication unit 110 may include at least one of a broadcast receiving module 111, a mobile communication module 112, a wireless Internet module 113, a short-range communication module 114, a location information module 115 and the like.

The input unit 120 may include a camera 121 for inputting an image signal, a microphone 122 or an audio input module for inputting an audio signal, or a user input unit 123 (for example, a touch key, a push key (or a mechanical key), etc.) for allowing a user to input information. Audio data or image data collected by the input unit 120 may be analyzed and processed by a user's control command.

The sensing unit 140 may include at least one sensor which senses at least one of internal information of the mobile terminal, a surrounding environment of the mobile terminal and user information. For example, the sensing unit 140 may include a proximity sensor 141, an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, refer to the camera 121), a microphone 122, a battery gage, an environment sensor (for example, a barometer, a hygrometer, a thermometer, a radiation detection sensor, a thermal sensor, a gas sensor, etc.), and a chemical sensor (for example, an electronic nose, a health care sensor, a biometric sensor, etc.). Further, the mobile terminal disclosed herein may utilize information in such a manner of combining information sensed by at least two sensors of those sensors.

The output unit 150 may be configured to output an audio signal, a video signal or a tactile signal. The output unit 150 may include a display unit 151, an audio output module 152, a haptic module 153, an optical output module 154 and the like. The display unit 151 may have an inter-layered structure or an integrated structure with a touch sensor so as to implement a touch screen. The touch screen may provide an output interface between the mobile terminal 100 and a user, as well as functioning as the user input unit 123 which provides an input interface between the mobile terminal 100 and the user.

The interface unit 160 may serve as an interface with various types of external devices connected with the mobile terminal 100. The interface unit 160, for example, may include wired or wireless headset ports, external power supply ports, wired or wireless data ports, memory card ports, ports for connecting a device having an identification module, audio input/output (I/O) ports, video I/O ports, earphone ports, or the like. The mobile terminal 100 may execute an appropriate control associated with a connected external device, in response to the external device being connected to the interface unit 160.

The memory 170 may store a plurality of application programs (or applications) executed in the mobile terminal 100, data for operations of the mobile terminal 100, instruction words, and the like. At least some of those application programs may be downloaded from an external server via wireless communication. Some others of those application programs may be installed within the mobile terminal 100 at the time of being shipped for basic functions of the mobile terminal 100 (for example, receiving a call, placing a call, receiving a message, sending a message, etc.). Further, the application programs may be stored in the memory 170, installed in the mobile terminal 100, and executed by the controller 180 to perform an operation (or a function) of the mobile terminal 100.

The controller 180 can typically control an overall operation of the mobile terminal 100 in addition to the operations associated with the application programs. The controller 180 can provide or process information or functions appropriate for a user by processing signals, data, information and the like, which are input or output by the aforementioned components, or activating the application programs stored in the memory 170.

The controller 180 can control at least part of the components illustrated in FIG. 1, in order to drive the application programs stored in the memory 170. In addition, the controller 180 can drive the application programs by combining at least two of the components included in the mobile terminal 100 for operation.

The power supply unit 190 may receive external power or internal power and supply appropriate power required for operating respective elements and components included in the mobile terminal 100 under the control of the controller 180. The power supply unit 190 may include a battery, and the battery may be an embedded battery or a replaceable battery.

At least part of those elements and components may be combined to implement operation and control of the mobile terminal or a control method of the mobile terminal according to various embodiments described herein. Also, the operation and control or the control method of the mobile terminal may be implemented in the mobile terminal in such a manner of activating at least one application program stored in the memory 170.

Hereinafter, each aforementioned component will be described in more detail with reference to FIG. 1A, prior to explaining various embodiments implemented by the mobile terminal 100 having the configuration. First, the wireless communication unit 110 will be described. The broadcast receiving module 111 of the wireless communication unit 110 may receive a broadcast signal and/or broadcast associated information from an external broadcast managing entity via a broadcast channel. The broadcast channel may include a satellite channel and a terrestrial channel. At least two broadcast receiving modules 111 may be provided in the mobile terminal 100 to simultaneously receive at least two broadcast channels or switch the broadcast channels.

The mobile communication module 112 may transmit/receive wireless signals to/from at least one of network entities, for example, a base station, an external mobile terminal, a server, and the like, on a mobile communication network, which is constructed according to technical standards or transmission methods for mobile communications (for example, Global System for Mobile Communication (GSM), Code Division Multi Access (CDMA), Wideband CDMA (WCDMA), High Speed Downlink Packet Access (HSDPA), High Speed Uplink Packet Access (HSUPA), Long Term Evolution (LTE), Long Term Evolution-Advanced (LTE-A), etc.)

Here, the wireless signals may include audio call signal, video (telephony) call signal, or various formats of data according to transmission/reception of text/multimedia messages.

The wireless Internet module 113 denotes a module for wireless Internet access. This module may be internally or externally coupled to the mobile terminal 100. The wireless Internet module 113 may transmit/receive wireless signals via communication networks according to wireless Internet technologies.

Examples of such wireless Internet access may include Wireless LAN (WLAN), Wireless Fidelity (Wi-Fi) Direct, Digital Living Network Alliance (DLNA), Wireless Broadband (Wibro), Worldwide Interoperability for Microwave Access (Wimax), High Speed Downlink Packet Access (HSDPA), High Speed Uplink Packet Access (HSUPA), Long Term Evolution (LTE), Long Term Evolution-Advanced (LTE-A), and the like. The wireless Internet module 113 may transmit/receive data according to at least one wireless Internet technology within a range including even Internet technologies which are not aforementioned.

From the perspective that the wireless Internet accesses according to Wibro, HSDPA, GSM, CDMA, WCDMA, LET and the like are executed via a mobile communication network, the wireless Internet module 113 which performs the wireless Internet access via the mobile communication network may be understood as a type of the mobile communication module 112.

The short-range communication module 114 denotes a module for short-range communications. Suitable technologies for implementing the short-range communications may include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, and the like. The short-range communication module 114 may support wireless communications between the mobile terminal 100 and a wireless communication system, between the mobile terminal 100 and another mobile terminal 100, or between the mobile terminal and a network where another mobile terminal 100 (or an external server) is located, via wireless personal area networks.

Here, the another mobile terminal 100 may be a wearable device, for example, a smart watch, a smart glass or a head mounted display (HMD), which can exchange data with the mobile terminal 100 (or to cooperate with the mobile terminal 100). The short-range communication module 114 may sense (recognize) a wearable device, which can communicate with the mobile terminal), near the mobile terminal 100. In addition, when the sensed wearable device is a device which is authenticated to communicate with the mobile terminal 100 according to the present invention, the controller 180 can transmit at least part of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user may check the received message using the wearable device.

The location information module 115 denotes a module for detecting or calculating a position of the mobile terminal. An example of the location information module 115 may include a Global Position System (GPS) module or a Wi-Fi module. For example, when the mobile terminal uses the GPS module, a position of the mobile terminal may be acquired using a signal sent from a GPS satellite. As another example, when the mobile terminal uses the Wi-Fi module, a position of the mobile terminal may be acquired based on information related to a wireless access point (AP) which transmits or receives a wireless signal to or from the Wi-Fi module. According to the need, the location information module 115 may perform any function of the other modules of the wireless communication unit 110 to obtain data for the location of the mobile terminal in a substitutional or additional manner. The location information module 115 may be a module used to obtain the location (or current location) of the mobile terminal, and may not be necessarily limited to a module for directly calculating or obtaining the location of the mobile terminal.

Next, the input unit 120 may be configured to provide an audio or video signal (or information) input to the mobile terminal or information input by a user to the mobile terminal. For the input of the audio information, the mobile terminal 100 may include one or a plurality of cameras 121. The camera 121 may process image frames of still pictures or video obtained by image sensors in a video call mode or a capture mode. The processed image frames may be displayed on the display unit 151. Further, the plurality of cameras 121 disposed in the mobile terminal 100 may be arranged in a matrix configuration. By use of the cameras 121 having the matrix configuration, a plurality of image information having various angles or focal points may be input into the mobile terminal 100. Also, the plurality of cameras 121 may be arranged in a stereoscopic structure to acquire a left image and a right image for implementing a stereoscopic image.

The microphone 122 may process an external audio signal into electric audio data. The processed audio data may be utilized in various manners according to a function being executed in the mobile terminal 100 (or an application program being executed). Further, the microphone 122 may include assorted noise removing algorithms to remove noise generated in the course of receiving the external audio signal.

The user input unit 123 may receive information input by a user. When information is input through the user input unit 123, the controller 180 can control an operation of the mobile terminal 100 to correspond to the input information. The user input unit 123 may include a mechanical input element (or a mechanical key, for example, a button located on a front/rear surface or a side surface of the mobile terminal 100, a dome switch, a jog wheel, a jog switch, etc.), and a touch-sensitive input means. As one example, the touch-sensitive input means may be a virtual key, a soft key or a visual key, which is displayed on a touch screen through software processing, or a touch key which is disposed on a portion except for the touch screen. Further, the virtual key or the visual key may be displayable on the touch screen in various shapes, for example, graphic, text, icon, video or a combination thereof.

Further, the sensing unit 140 may sense at least one of internal information of the mobile terminal, surrounding environment information of the mobile terminal and user information, and generate a sensing signal corresponding to it. The controller 180 can control an operation of the mobile terminal 100 or execute data processing, a function or an operation associated with an application program installed in the mobile terminal based on the sensing signal. Hereinafter, description will be given in more detail of representative sensors of various sensors which may be included in the sensing unit 140.

First, a proximity sensor 141 refers to a sensor to sense presence or absence of an object approaching to a surface to be sensed, or an object disposed near a surface to be sensed, by using an electromagnetic field or infrared rays without a mechanical contact. The proximity sensor 141 may be arranged at an inner region of the mobile terminal covered by the touch screen, or near the touch screen. The proximity sensor 141 may have a longer lifespan and a more enhanced utility than a contact sensor.

The proximity sensor 141, for example, may include a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and so on. When the touch screen is implemented as a capacitance type, the proximity sensor 141 may sense proximity of a pointer to the touch screen by changes of an electromagnetic field, which is responsive to an approach of an object with conductivity. In this instance, the touch screen (touch sensor) may be categorized into a proximity sensor.

Further, for the sake of brief explanation, a status that the pointer is positioned to be proximate onto the touch screen without contact will be referred to as 'proximity touch,' whereas a status that the pointer substantially comes in contact with the touch screen will be referred to as 'contact touch.' For the position corresponding to the proximity touch of the pointer on the touch screen, such position will correspond to a position where the pointer faces perpendicular to the touch screen upon the proximity touch of the pointer. The proximity sensor 141 may sense proximity touch, and proximity touch patterns (e.g., distance, direction, speed, time, position, moving status, etc.). Further, the controller 180 can process data (or information) corresponding to the proximity touches and the proximity touch patterns sensed by the proximity sensor 141, and output visual information corresponding to the process data on the touch screen. In addition, the controller 180 can control the mobile terminal 100 to execute different operations or process different data (or information) according to whether a touch with respect to the same point on the touch screen is either a proximity touch or a contact touch.

A touch sensor may sense a touch (or touch input) applied onto the touch screen (or the display unit 151) using at least one of various types of touch methods, such as a resistive type, a capacitive type, an infrared type, a magnetic field type, and the like.

As one example, the touch sensor may be configured to convert changes of pressure applied to a specific part of the display unit 151 or a capacitance occurring from a specific part of the display unit 151, into electric input signals. Also, the touch sensor may be configured to sense not only a touched position and a touched area, but also touch pressure. Here, a touch object is an object to apply a touch input onto the touch sensor. Examples of the touch object may include a finger, a touch pen, a stylus pen, a pointer or the like.

When touch inputs are sensed by the touch sensors as described above, corresponding signals may be transmitted to a touch controller. The touch controller may process the received signals, and then transmit corresponding data to the controller 180. Accordingly, the controller 180 can sense which region of the display unit 151 has been touched. Here, the touch controller may be a component separate from the controller 180 or the controller 180 itself.

Further, the controller 180 can execute a different control or the same control according to a type of an object which touches the touch screen (or a touch key provided in addition to the touch screen). Whether to execute the different control or the same control according to the object which gives a touch input may be decided based on a current operating state of the mobile terminal 100 or a currently executed application program.

Meanwhile, the touch sensor and the proximity sensor may be executed individually or in combination, to sense various types of touches, such as a short (or tap) touch, a long touch, a multi-touch, a drag touch, a flick touch, a pinch-in touch, a pinch-out touch, a swipe touch, a hovering touch, and the like.

An ultrasonic sensor may be configured to recognize position information relating to a sensing object by using ultrasonic waves. The controller 180 can calculate a position of a wave generation source based on information sensed by an illumination sensor and a plurality of ultrasonic sensors. Since light is much faster than ultrasonic waves, a time for which the light reaches the optical sensor may be much shorter than a time for which the ultrasonic wave reaches the ultrasonic sensor. The position of the wave generation source may be calculated using the fact. In more detail, the position of the wave generation source may be calculated by using a time difference from the time that the ultrasonic wave reaches based on the light as a reference signal.

The camera 121 constructing the input unit 120 may be a type of camera sensor (for example, CCD, CMOS, etc.) The camera sensor may include at least one of a photo sensor and a laser sensor. The camera 121 and the laser sensor may be combined to detect a touch of the sensing object with respect to a 3D stereoscopic image. The photo sensor may be laminated on the display device. The photo sensor may be configured to scan a movement of the sensing object in proximity to the touch screen. In more detail, the photo sensor may include photo diodes and transistors at rows and columns to scan content placed on the photo sensor by using an electrical signal which changes according to the quantity of applied light. Namely, the photo sensor may calculate the coordinates of the sensing object according to variation of light to thus obtain position information of the sensing object.

The display unit 151 may output information processed in the mobile terminal 100. For example, the display unit 151 may display execution screen information of an application program driven in the mobile terminal 100 or user interface (UI) and graphic user interface (GUI) information in response to the execution screen information.

Furthermore, the display unit 151 may also be implemented as a stereoscopic display unit for displaying stereoscopic images. The stereoscopic display unit may employ a stereoscopic display scheme such as stereoscopic scheme (a glass scheme), an auto-stereoscopic scheme (glassless scheme), a projection scheme (holographic scheme), or the like.

The audio output module 152 can output audio data received from the wireless communication unit 110 or stored in the memory 160 in a call signal reception mode, a call mode, a record mode, a voice recognition mode, a broadcast reception mode, and the like. Also, the audio output module 152 can also provide audible output signals related to a particular function (e.g., a call signal reception sound, a message reception sound, etc.) performed by the mobile terminal 100. The audio output module 152 may include a receiver, a speaker, a buzzer or the like.

A haptic module 153 can generate various tactile effects the that user may feel. A typical example of the tactile effect generated by the haptic module 153 may be vibration. Strength, pattern and the like of the vibration generated by the haptic module 153 may be controllable by a user selection or setting of the controller. For example, the haptic module 153 can output different vibrations in a combining manner or a sequential manner.

Besides vibration, the haptic module 153 can generate various other tactile effects, including an effect by stimulation such as a pin arrangement vertically moving with respect to a contact skin, a spray force or suction force of air through a jet orifice or a suction opening, a touch on the skin, a contact of an electrode, electrostatic force, etc., an effect by reproducing the sense of cold and warmth using an element that can absorb or generate heat, and the like.

The haptic module 153 may be implemented to allow the user to feel a tactile effect through a muscle sensation such as the user's fingers or arm, as well as transferring the tactile effect through a direct contact. Two or more haptic modules 153 may be provided according to the configuration of the mobile terminal 100.

An optical output module 154 can output a signal for indicating an event generation using light of a light source. Examples of events generated in the mobile terminal 100 may include a message reception, a call signal reception, a missed call, an alarm, a schedule notice, an email reception, an information reception through an application, and the like.

A signal output by the optical output module 154 may be implemented so the mobile terminal emits monochromatic light or light with a plurality of colors. The signal output may be terminated as the mobile terminal senses a user's event checking.

The interface unit 160 can serve as an interface with every external device connected with the mobile terminal 100. For example, the interface unit 160 can receive data transmitted from an external device, receive power to transfer to each element within the mobile terminal 100, or transmit internal data of the mobile terminal 100 to an external device. For example, the interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (referred to as 'identifying device', hereinafter) may take the form of a smart card. Accordingly, the identifying device may be connected with the terminal 100 via the interface unit 160.

When the mobile terminal 100 is connected with an external cradle, the interface unit 160 can serve as a passage to allow power from the cradle to be supplied to the mobile terminal 100 therethrough or may serve as a passage to allow various command signals input by the user from the cradle to be transferred to the mobile terminal therethrough. Various command signals or power input from the cradle may operate as signals for recognizing that the mobile terminal is properly mounted on the cradle.

The memory 170 can store programs for operations of the controller 180 and temporarily store input/output data (for example, phonebook, messages, still images, videos, etc.). The memory 170 may store data related to various patterns of vibrations and audio which are output in response to touch inputs on the touch screen.

The memory 170 may include at least one type of storage medium including a Flash memory, a hard disk, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, and an optical disk. Also, the mobile terminal 100 may be operated in relation to a web storage device that performs the storage function of the memory 170 over the Internet.

As aforementioned, the controller 180 can typically control the general operations of the mobile terminal 100. For example, the controller 180 can set or release a lock state for restricting a user from inputting a control command with respect to applications when a status of the mobile terminal meets a preset condition.

The controller 180 can also perform controlling and processing associated with voice calls, data communications, video calls, and the like, or perform pattern recognition processing to recognize a handwriting input or a picture drawing input performed on the touch screen as characters or images, respectively. In addition, the controller 180 can control one or combination of those components in order to implement various embodiment disclosed herein on the mobile terminal 100.

The power supply unit 190 can receive external power or internal power and supply appropriate power required for operating respective elements and components included in the mobile terminal 100 under the control of the controller 180. The power supply unit 190 may include a battery. The battery may be an embedded battery which is rechargeable or be detachably coupled to the terminal body for charging.

The power supply unit 190 may include a connection port. The connection port may be configured as one example of the interface unit 160 to which an external (re)charger for supplying power to recharge the battery is electrically connected.

As another example, the power supply unit 190 may be configured to recharge the battery in a wireless manner without use of the connection port. Here, the power supply unit 190 may receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable or its similar medium using, for example, software, hardware, or any combination thereof.

Referring to FIGS. 1B and 1C, the mobile terminal 100 disclosed herein may be provided with a bar-type terminal body. However, the present invention is not limited to this, but also may be applicable to various structures such as watch type, clip type, glasses type or folder type, flip type, slide type, swing type, swivel type, or the like, in which two and more bodies are combined with each other in a relatively movable manner.

The mobile terminal 100 may include a case (casing, housing, cover, etc.) forming the appearance of the terminal. In this embodiment, the case may be divided into a front case 101 and a rear case 102. Various electronic components may be incorporated into a space formed between the front case 101 and the rear case 102. At least one middle case may be additionally disposed between the front case 101 and the rear case 102.

A display unit 151 may be disposed on a front surface of the terminal body to output information. As illustrated, a window 151a of the display unit 151 may be mounted to the front case 101 so as to form the front surface of the terminal body together with the front case 101.

In some cases, electronic components may also be mounted to the rear case 102. Examples of those electronic components mounted to the rear case 102 may include a detachable battery, an identification module, a memory card and the like. Here, a rear cover 103 for covering the electronic components mounted may be detachably coupled to the rear case 102. Therefore, when the rear cover 103 is detached from the rear case 102, the electronic components mounted to the rear case 102 may be externally exposed.

As illustrated, when the rear cover 103 is coupled to the rear case 102, a side surface of the rear case 102 may be partially exposed. In some cases, upon the coupling, the rear case 102 may also be completely shielded by the rear cover 103. Further, the rear cover 103 may include an opening for externally exposing a camera 121b or an audio output module 152b.

The cases 101, 102, 103 may be formed by injection-molding synthetic resin or may be formed of a metal, for example, stainless steel (STS), titanium (Ti), or the like. Unlike the example which the plurality of cases form an inner space for accommodating such various components, the mobile terminal 100 may be configured such that one case forms the inner space. In this example, a mobile terminal 100 having a uni-body formed so synthetic resin or metal extends from a side surface to a rear surface may also be implemented.

Further, the mobile terminal 100 may include a waterproofing unit for preventing an introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

The mobile terminal 100 may include a display unit 151, first and second audio output modules 152a and 152b, a proximity sensor 141, an illumination sensor 142, an optical output module 154, first and second cameras 121a and 121b, first and second manipulation units 123a and 123b, a microphone 122, an interface unit 160 and the like.

Hereinafter, description will be given of an mobile terminal 100 that the display unit 151, the first audio output module 152a, the proximity sensor 141, the illumination sensor 142, the optical output module 154, the first camera 121a and the first manipulation unit 123a are disposed on the front surface of the terminal body, the second manipulation unit 123b, the microphone 122 and the interface unit 160 are disposed on a side surface of the terminal body, and the second audio output module 152b and the second camera 121b are disposed on a rear surface of the terminal body, with reference to FIGS. 1B and 1C.

Here, those components are not limited to the arrangement, but be excluded or arranged on another surface if necessary. For example, the first manipulation unit 123a may not be disposed on the front surface of the terminal body, and the second audio output module 152b may be disposed on the side surface other than the rear surface of the terminal body.

The display unit 151 may output information processed in the mobile terminal 100. For example, the display unit 151 may display execution screen information of an application program driven in the mobile terminal 100 or user interface (UI) and graphic user interface (GUI) information in response to the execution screen information.

The display unit 151 may include at least one of a liquid crystal display (LCD), a thin film transistor-liquid crystal display (TFT-LCD), an organic light emitting diode (OLED), a flexible display, a 3-dimensional (3D) display, and an e-ink display. The display unit 151 may be implemented in two or more in number according to a configured aspect of the mobile terminal 100. For instance, a plurality of the display units 151 may be arranged on one surface to be spaced apart from or integrated with each other, or may be arranged on different surfaces.

The display unit 151 may include a touch sensor which senses a touch onto the display unit so as to receive a control command in a touching manner. When a touch is input to the display unit 151, the touch sensor may be configured to sense this touch and the controller 180 can generate a control command corresponding to the touch. The content which is input in the touching manner may be a text or numerical value, or a menu item which can be indicated or designated in various modes.

The touch sensor may be configured in a form of film having a touch pattern. The touch sensor may be a metal wire, which is disposed between the window 151a and a display on a rear surface of the window 151a or patterned directly on the rear surface of the window 151a. Or, the touch sensor may be integrally formed with the display. For example, the touch sensor may be disposed on a substrate of the display or within the display.

The display unit 151 may form a touch screen together with the touch sensor. Here, the touch screen may serve as the user input unit 123 (see FIG. 1A). Therefore, the touch screen may replace at least some of functions of the first manipulation unit 123a. The first audio output module 152a may be implemented in the form of a receiver for transferring voice sounds to the user's ear or a loud speaker for outputting various alarm sounds or multimedia reproduction sounds.

The window 151a of the display unit 151 may include a sound hole for emitting sounds generated from the first audio output module 152a. Here, the present invention may not be limited to this. It may also be configured such that the sounds are released along an assembly gap between the structural bodies (for example, a gap between the window 151a and the front case 101). In this instance, a hole independently formed to output audio sounds may not be seen or hidden in terms of appearance, thereby further simplifying the appearance of the mobile terminal 100.

The optical output module 154 may output light for indicating an event generation. Examples of the event generated in the mobile terminal 100 may include a message reception, a call signal reception, a missed call, an alarm, a schedule notice, an email reception, information reception through an application, and the like. When a user's event checking is sensed, the controller may control the optical output unit 154 to stop the output of the light.

The first camera 121a may process video frames such as still or moving images obtained by the image sensor in a video call mode or a capture mode. The processed video frames may be displayed on the display unit 151 or stored in the memory 170. The first and second manipulation units 123a and 123b are examples of the user input unit 123, which may be manipulated by a user to input a command for controlling the operation of the mobile terminal 100. The first and second manipulation units 123a and 123b may also be commonly referred to as a manipulating portion, and may employ any method if it is a tactile manner allowing the user to perform manipulation with a tactile feeling such as touch, push, scroll or the like.

The drawings illustrate the first manipulation unit 123a is a touch key, but the present invention may not be necessarily limited to this. For example, the first manipulation unit 123a may be configured with a mechanical key, or a combination of a touch key and a push key.

The content received by the first and second manipulation units 123a and 123b may be set in various ways. For example, the first manipulation unit 123a may be used by the user to input a command such as menu, home key, cancel, search, or the like, and the second manipulation unit 123b may be used by the user to input a command, such as controlling a volume level being output from the first or second audio output module 152a or 152b, switching into a touch recognition mode of the display unit 151, or the like.

Further, as another example of the user input unit 123, a rear input unit may be disposed on the rear surface of the terminal body. The rear input unit may be manipulated by a user to input a command for controlling an operation of the mobile terminal 100. The content input may be set in various ways. For example, the rear input unit may be used by the user to input a command, such as power on/off, start, end, scroll or the like, controlling a volume level being output from the first or second audio output module 152a or 152b, switching into a touch recognition mode of the display unit 151, or the like. The rear input unit may be implemented into a form allowing a touch input, a push input or a combination thereof.

The rear input unit may be disposed to overlap the display unit 151 of the front surface in a thickness direction of the terminal body. As one example, the rear input unit may be disposed on an upper end portion of the rear surface of the terminal body such that a user can easily manipulate it using a forefinger when the user grabs the terminal body with one hand. However, the present invention may not be limited to this, and the position of the rear input unit may be changeable.

When the rear input unit is disposed on the rear surface of the terminal body, a new user interface may be implemented using the rear input unit. Also, the aforementioned touch screen or the rear input unit may substitute for at least part of functions of the first manipulation unit 123a located on the front surface of the terminal body. Accordingly, when the first manipulation unit 123a is not disposed on the front surface of the terminal body, the display unit 151 may be implemented to have a larger screen.

Further, the mobile terminal 100 may include a finger scan sensor which scans a user's fingerprint. The controller may use fingerprint information sensed by the finger scan sensor as an authentication means. The finger scan sensor may be installed in the display unit 151 or the user input unit 123.

The microphone 122 may be formed to receive the user's voice, other sounds, and the like. The microphone 122 may be provided at a plurality of places, and configured to receive stereo sounds.

The interface unit 160 may serve as a path allowing the mobile terminal 100 to exchange data with external devices. For example, the interface unit 160 may be at least one of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b may be further mounted to the rear surface of the terminal body. The second camera 121b may have an image capturing direction, which is substantially opposite to the direction of the first camera unit 121a.

The second camera 121b may include a plurality of lenses arranged along at least one line. The plurality of lenses may also be arranged in a matrix configuration. The cameras may be referred to as an 'array camera.' When the second camera 121b is implemented as the array camera, images may be captured in various manners using the plurality of lenses and images with better qualities may be obtained.

A flash 124 may be disposed adjacent to the second camera 121b. When an image of a subject is captured with the camera 121b, the flash 124 may illuminate the subject.

The second audio output module 152b may further be disposed on the terminal body. The second audio output module 152b may implement stereophonic sound functions in conjunction with the first audio output module 152a (refer to FIG. 1A), and may be also used for implementing a speaker phone mode for call communication.

At least one antenna for wireless communication may be disposed on the terminal body. The antenna may be installed in the terminal body or formed on the case. For example, an antenna which configures a part of the broadcast receiving module 111 (see FIG. 1A) may be retractable into the terminal body. Alternatively, an antenna may be formed in a form of film to be attached onto an inner surface of the rear cover 103 or a case including a conductive material may serve as an antenna.

A power supply unit 190 for supplying power to the mobile ten final 100 may be disposed on the terminal body. The power supply unit 190 may include a batter 191 which is mounted in the terminal body or detachably coupled to an outside of the terminal body.

The battery 191 may receive power via a power source cable connected to the interface unit 160. Also, the battery 191 may be (re)chargeable in a wireless manner using a wireless charger. The wireless charging may be implemented by magnetic induction or electromagnetic resonance.

Further, the drawing illustrates that the rear cover 103 is coupled to the rear case 102 for shielding the battery 191, so as to prevent separation of the battery 191 and protect the battery 191 from an external impact or foreign materials. When the battery 191 is detachable from the terminal body, the rear case 103 may be detachably coupled to the rear case 102.

An accessory for protecting an appearance or assisting or extending the functions of the mobile terminal 100 may further be provided on the mobile terminal 100. As one example of the accessory, a cover or pouch for covering or accommodating at least one surface of the mobile terminal 100 may be provided. The cover or pouch may cooperate with the display unit 151 to extend the function of the mobile terminal 100. Another example of the accessory may be a touch pen for assisting or extending a touch input onto a touch screen.

Furthermore, the controller 180 of a mobile terminal according to an embodiment of the present invention capable of including at least one of the foregoing constituent elements may switch a lock state of the pre-registered external device to a release state when a plurality of touch inputs applied to the display unit 151 correspond to a preset criteria when the display unit 151 is deactivated. Subsequently, the controller 180 can activate a predetermined region on the display unit 151, and then control the display operation to display the screen of the external device corresponding to the release state.

Here, the state of the display unit 151 being "deactivated" denotes a state in which lighting for illuminating the display unit 151 provided therewithin is in an "off" state. Furthermore, "activating" one region of the display unit 151 denotes a state in which lighting for illuminating one region of the display unit 151 provided therewithin becomes an "on" state.

Furthermore, the external device is a concept containing all other terminals linked to the mobile terminal 100. For example, the example of the external device may include navigators, slate PCs, tablet PCs, ultra books, wearable devices (for example, smart watches, smart glasses, head mounted displays (HMDs)), Bluetooth head sets and the like.

When the foregoing external device is previously connected or accessed to the mobile terminal 100 or a plurality of touch inputs corresponding to a preset criteria are applied to the display unit 151, a control command corresponding to the connection or access may be transmitted at the same time.

The foregoing "lock state" of the external device is a state in which a user's control command input to applications contained in the external device linked to the mobile terminal 100 is restricted. In the "lock state", the display unit of the external device may be in an inactive state or active state. In the latter case, a lock screen corresponding to the lock state may be displayed on a screen provided on the external device. Meanwhile, though a user's control command input is restricted in the "lock state", a function and the operations of the applications that have been operated prior to implementing the lock state may be continuously performed.

Furthermore, a plurality of touch inputs corresponding to a preset criteria denote a pattern in which a tap hitting the body is sensed when the display unit 151 is deactivated, and a user's operation pattern formed by sequentially connecting the sensed tap positions matches a preset pattern registered to release the release state. Further, according to another example, a plurality of touch inputs corresponding to a preset criteria denotes a case where a touch is performed in a predetermined region, and then a consecutive touch followed within a preset period of time is applied to the predetermined region.

Thus, in order to sense a plurality of touch inputs applied to the display unit 151 when the display unit 151 is deactivated, the mobile terminal 100 according to an embodiment of the present invention may use only either one of an acceleration sensor and a touch sensor, sequentially use the acceleration sensor and touch sensor, or concurrently use the acceleration sensor and touch sensor.

Furthermore, the "release state" of the external device is a state in which a user's control command input to an external device linked to the mobile terminal 100 is not restricted. Accordingly, when the screen of the external device corresponding to the release state is displayed in one region of the display unit 151, the function and applications of the external device may be activated or deactivated according to a control command entered through the touch sensor or user input unit 130 provided in one region of the display unit 151.

Further, here, the foregoing "lock state" may be performed again when a user's input is not sensed for a preset period of time when the screen of the external device corresponding to the release state is displayed in one region of the display unit 151. Here, the preset period of time may be changed by the user's setting.

In other words, in an embodiment according to an embodiment of the present invention, the mobile terminal 100 according to an embodiment of the present invention may apply a plurality of touch inputs to the display unit 151 in an inactive state, thereby switching the linked external device to an active state or switching a lock state to a release state. Accordingly, the user may omit a complicated process for taking out another terminal to be used to turn on the display unit, and entering a password using a virtual keypad or the like to release a lock state.

Hereinafter, FIG. 2 is a representative conceptual view illustrating an operation implemented according to an embodiment of the present invention. As illustrated in FIGS. 2(a) and 2(b), the display unit 151 is partitioned into a plurality of virtual regions (A, B, C, D) when the display unit 151 is deactivated.

Here, the plurality of regions are illustrated as an example in which the entire display unit 151 is partitioned into four regions (A, B, C, D), but the present invention is not limited to this. In other words, the plurality of regions may be partitioned with a number of regions less than or greater than the four regions of the display unit 151, and may be generated only in one region of the display unit 151 (a region corresponding to a user's left/right hand when holding the terminal with his or her one hand).

At least one of the partitioned regions (A, B, C, D) may be used as an input region capable of controlling at least one external device linked to the mobile terminal 100. Thus, an external device corresponding to the user's setting may be pre-registered in at least one of the partitioned regions (A, B, C, D). Further, though information associated with the plurality of regions cannot be displayed when the display unit 151 is deactivated, that the figures include numerals indicating a virtual line for partitioning a region and the plurality of regions for the sake of convenience of explanation.

Thus, the sensing unit 140 can sense a plurality of touch inputs applied to at least one of the plurality of regions when the display unit 151 partitioned into a plurality of virtual regions (A, B, C, D) is deactivated. Subsequently, a result sensed by the sensing unit 140 is transferred to the controller 180.

Figure 2A:
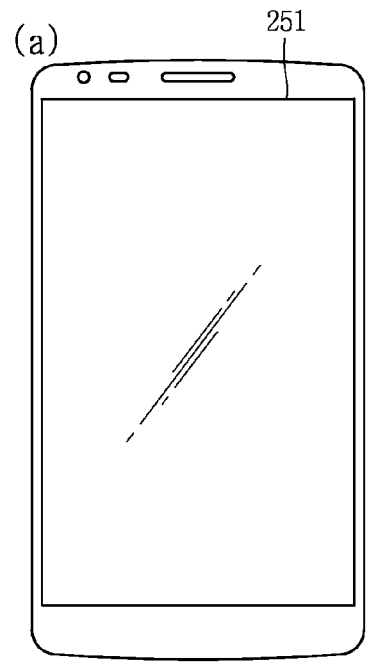
FIGS. 2(a) to 2(d) are representative conceptual views illustrating an operation implemented according to an embodiment of the present invention.
Figure 2B:
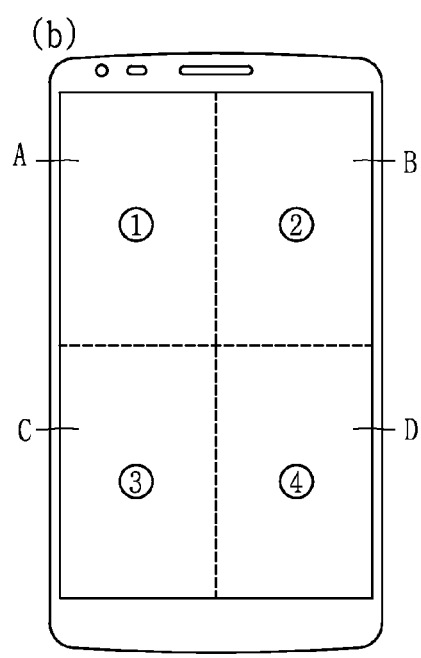
Figure 2C:
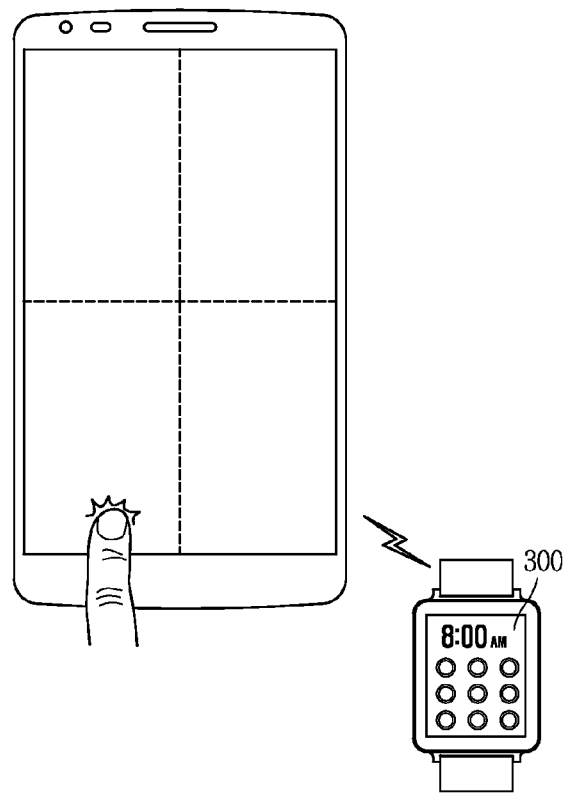

In other words, as illustrated in FIG. 2(c), when a touch input is applied to a specific region ("C") of the plurality of regions by a user (for example, finger, fist, stylus pen, or the like) when the display unit 151 is deactivated, the sensing unit 140 can sense a location to which the touch input is applied, an input interval thereof, and the like, and sense which one of the partitioned virtual regions to which the location is applied. Thus, the mobile terminal 100 may use only either one of an acceleration sensor and a touch sensor, sequentially use the acceleration sensor and touch sensor, or concurrently use the acceleration sensor and touch sensor.

The controller 180 can determine whether or not a plurality of touch input sensed through the sensing unit 140 correspond to a preset criteria. The plurality of touch inputs corresponding to a preset criteria denotes when a plurality of taps sensed when the display unit 151 is deactivated is consecutively applied within a preset limited period of time, and a user's operation pattern formed by sequentially connecting the sensed tap positions satisfies a first condition matching a pre-registered pattern.

Otherwise, the plurality of touch inputs corresponding to a preset criteria denotes when a plurality of taps sensed in a specific region when the display unit 151 is deactivated satisfy a second condition in which they are consecutively applied within a preset limited period of time. A plurality of touch inputs satisfying the second condition as described above is called a "knock-knock" (or knock-on) being sensed for the purpose of controlling a specific external device.

FIG. 2(c) illustrates when a second condition in which a plurality of taps sensed in region "C" are consecutively applied within a preset limited period of time. Thus, when a plurality of touch input satisfying the first or second condition is applied to the display unit 151, the controller 180 can recognize a pre-registered external device corresponding to a region to which a plurality of touch inputs are applied among the plurality of regions. For example, a "watch type terminal 300" corresponding to a specific region ("C") to which a plurality of traffic indication response message are applied can be recognized in FIG. 2(c).

Next, the controller 180 performs a control operation corresponding to a touch input with respect to the recognized external device. Here, a connection or access between the mobile terminal 100 and the recognized external device may be performed in advance or performed when a touch input satisfying the foregoing condition (first or second condition) is applied thereto (in other words, a control command for connecting or accessing to the recognized external device may be transmitted along with a control command corresponding to the control operation).

Specifically, the controller 180 transfers a control command for switching a recognized external device to an "on" state to the recognized external device. Accordingly, as illustrated in FIG. 2(c), the display of the watch type terminal 300 corresponding to the region ("C") is turned into an "on" state.

Here, when a plurality of touch inputs applied to a specific region satisfies a first condition matching a pre-registered pattern, a lock state of the watch type terminal 300 is switched to a release state, and a screen corresponding to the release state is displayed on the display of the watch type terminal 300. Meanwhile, when a plurality of touch inputs applied to a specific region satisfies a second condition in which they are consecutively applied within a preset limited period of time, a lock screen corresponding to the lock state is displayed on the display of the watch type terminal 300 as illustrated in FIG. 2(c).

Figure 2D:
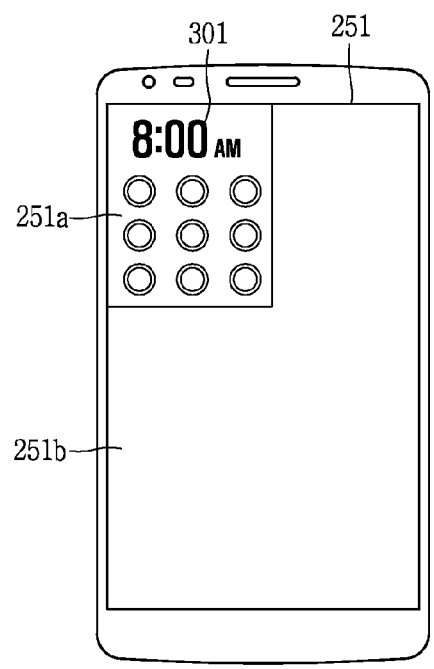

Subsequently, the controller 180 switches one region of the display unit 151, namely, an upper left portion thereof, to an active state, and receives screen information from the external device that has been switched to an "on" state to display it on the activated one region as illustrated in FIG. 2(d). In other words, the lock screen 301 of the watch type terminal 300 is displayed in the first region 251a. In addition, another region 251b out of said one region of the display unit 151 may continuously maintain an inactive state.

Further, the user may apply a touch for entering a preset pattern to the lock screen 301 in the first region 251a illustrated in FIG. 2(d) to switch a lock state of the external device to a release state. In other words, the user may control the display operation of the external device using the display unit 151 of the mobile terminal 100. When a pattern entered to the lock screen 301 matches a preset pattern, the lock state of the external device is released, and a screen corresponding to the release is displayed on the screen of the first region 251a and the external device.

Furthermore, a predetermined key provided in the mobile terminal 100 is pushed to the mobile terminal 100 to switch the entire display unit 151 to an active state, and display a lock screen corresponding to the lock state or a home screen page on the display unit 151, the screen of the external device that has been displayed in the first region 251a may disappear.

As described above, the lock state of another pre-registered terminal may be released using a plurality of taps applied to the display unit 151 when the display unit 151 of the mobile terminal 100 is deactivated. According to this, a complicated process for taking out an external device to turn on the display unit, and then entering a password using a virtual keypad or the like to release the lock state of the external device linked to the mobile terminal 100 is omitted.

Hereinafter, a method of controlling the mobile terminal 100 according to an embodiment of the present invention will be described in detail with reference to FIG. 3. The present invention will be described on the assumption that the display unit 151 of the mobile terminal 100 according to an embodiment of the present invention is provided with a touch sensor configured to sense a touch input, and initially in an inactive state. Here, the "state that the display unit 151 is deactivated" denotes a state in which lighting for illuminating the display unit 151 provided therewithin is in an "off" state as described above.

When the display unit 151 is deactivated, the sensing unit 140 of the mobile terminal 100 can sense a plurality of touch inputs applied to at least one region of the display unit 151 (S310). Here, a plurality of touch inputs may denotes taps consecutively hitting one region of the display unit 151 within a preset limited period of time.

Thus, when a plurality of touch input are applied, the controller 180 determines whether or not the plurality of sensed touch inputs correspond to a preset criteria (S320). Here, the plurality of touch inputs corresponding to a preset criteria denotes when a tap hitting the body is sensed in a specific region when the display unit 151 is deactivated, and a user's operation pattern formed by sequentially connecting the sensed tap positions satisfies a first condition matching a preset pattern registered to release the lock state of the external device corresponding to the specific region.

Thus, the display unit 151 may be partitioned into a plurality of virtual regions in an inactive state. The virtual regions may be formed with an upper left, an upper right, a lower left and a lower right quadrants in which the display unit 151 is partitioned by the x and y axes based on a central position as illustrated in FIG. 2(b). However, the present invention is not limited to this, and the plurality of virtual regions may be formed in various ways such as dividing the display unit 151 into an upper and a lower half portions or an upper, a middle and a lower one-third portions, and the like.

When the plurality of sensed touch inputs satisfy the condition (first condition), the controller 180 recognizes an external device corresponding to a region to which the touch inputs are applied, and switches a lock state of the external device to a release state (S330).

Here, the external device corresponding to a region to which the touch inputs are applied denotes another terminal matched through the user setting to control the another terminal using a specific region. For example, when a plurality of touch inputs are applied to a first quadrant of the partitioned virtual regions on the display unit 151, for example, an upper left region thereof, when the display unit 151 is deactivated, the controller 180 can recognize another terminal for example, glass type terminal, registered to match the relevant region. Thus, the external device corresponding to a region to which the touch inputs are applied may be changed by the user setting.

Specifically, the controller 180 transfers a first control command for connecting to a recognized external device to the recognized external device through the wireless communication unit 110. Upon receiving a response to the first control command from the external device, the controller 180 transfers a second control command for switching a lock state of the connected external device to a release state to the external device through the wireless communication unit 110. Here, when the mobile terminal 100 and the external device have been connected to each other, the transfer of the first control command may be omitted.

Further, when a connection to the first control command has failed, the controller may display a feedback corresponding to the connection failure (for example, notification of a connection failure and cause of a connection failure) in one region of the display unit 151 or notify it to the user through the audio output unit 152.

Thus, when the lock state is switched to the release state, the controller may output a feedback indicating switching to the release state (for example, vibration, sound (e.g., "beep sound" or "lock is released"), LED effect) to the mobile terminal 100 and/or external device. Through this, the user can recognize that the mobile terminal 100 and the external device are connected to each other, and a lock state of the connected external device has been released).

Further, according to another example, the plurality of touch inputs corresponding to a preset criteria denotes when a touch is performed in a predetermined region, and then a consecutive touch followed within a preset period of time is applied to the predetermined region, namely, it satisfies a second condition in which a "knock-on" is sensed in a specific region. In this instance, the controller 180 can recognize an external device corresponding to a region too which a "knock-on" is applied, and switch the recognized external device to an active state, namely, a state in which the display is activated. In addition, a lock screen formed to enter a password, for example, is displayed on the display of the external device switched to an active state.

Next, the controller 180 can switch one region of the display unit 151 to an active state (S340). Here, said one region ("first region") may be previously determined as a default value or changed by a user setting. Furthermore, the first region may be defined as a region corresponding to a region to which a plurality of touch inputs are applied. Specifically, the first region may be defined as a form of being completely identical to a region to which a plurality of touch inputs are applied among virtual regions partitioned on the display unit 151, or contained in the region, or in which part thereof is overlapped with the region and the other portion thereof is out of the region.

Furthermore, the controller 180 can control another region ("second region") out of one region of the display unit 151 to continuously maintain an inactive state. Subsequently, the controller 180 receives screen information corresponding to the release state through the wireless communication unit 110 from the external device to display it in the active region (S350).

Here, a screen displayed in the release state may be at least one of a home screen, an execution screen of an application, a menu screen, and a screen corresponding to an event occurred on the terminal. When the screen is a home screen, it may include at least one object. The object may be an icon or widget of an application installed on an external device. Furthermore, the screen may be a screen corresponding to screen information that has been most recently displayed on the display prior to executing the lock state of the external device.

The controller 180 can change at least one of the location and size of a first region displayed with screen information corresponding to the release state through a preset type of touch input. Further, when a plurality of touch inputs corresponding to a preset criteria satisfy the foregoing second condition, screen information corresponding to an "on" state of the external device, namely, a lock screen of the external device, may be displayed in the active region. The user may perform an input having a preset pattern on the displayed lock screen to switch a lock state of the external device to a release state.

Furthermore, when a screen corresponding to the release state or a lock screen of the external device is displayed in the first region, the controller 180 can partition the foregoing plurality of virtual regions again based on the second region. In addition, the controller 180 can perform an operation mode to activate only either one of when a plurality of touch inputs applied to the display unit 151 in an inactive state correspond to a first criteria and when they correspond to a second criteria.

For example, the security can be enhanced when an operation mode is set to control the display operation of an external device only when corresponding to a first criteria. Specifically, when a "knock-on" is applied when the external device is a Bluetooth headset, a plurality of touch inputs with a preset operation pattern may be applied without immediately performing a "pairing" procedure, thereby preventing any use thereof by a third party during a theft of the external device. Furthermore, for example, when an operation mode is set to control the display operation of an external device only when corresponding to a second criteria, it may be possible to access a desired external device to take a screen only by applying a "knock-on" to a specific region, thereby further enhancing user convenience.

As described in the above flow chart, according to an embodiment of the present invention, a plurality of touch inputs with a preset pattern may be applied to a specific region when the display unit 151 of the mobile terminal 100 is deactivated to release the lock state of the linked external device. Accordingly, the processes of taking out an external device to be used to activate the display unit, and then performing a specific pattern input on a lock screen displayed on the screen of the external device can be all omitted, thereby providing a convenient user environment.

Hereinafter, FIG. 4 is a conceptual view illustrating a method of controlling the screen of an external device using a touch input applied to the display unit as an example of the operation implemented according to an embodiment of the present invention. When an initial touch is applied to a specific region of the plurality of virtual regions when the display unit 151 is deactivated without forming an operation pattern and then a consecutive touch followed within a preset period of time is applied to the specific region, namely, when a "knock-on" is performed in the specific region, the controller 180 can recognize an external device corresponding to the specific region, and switch the recognized external device to an "on" state.

In addition, the display of the external device is switched from an inactive state to an active state. Accordingly, a "lock screen" appears on the display of the external device. In this state, the controller 180 of the mobile terminal 100 can receive screen information displayed on the external device through the wireless communication unit 110 to display it in the first region (for example, predetermined region) of the display unit 151.

Figure 4A:
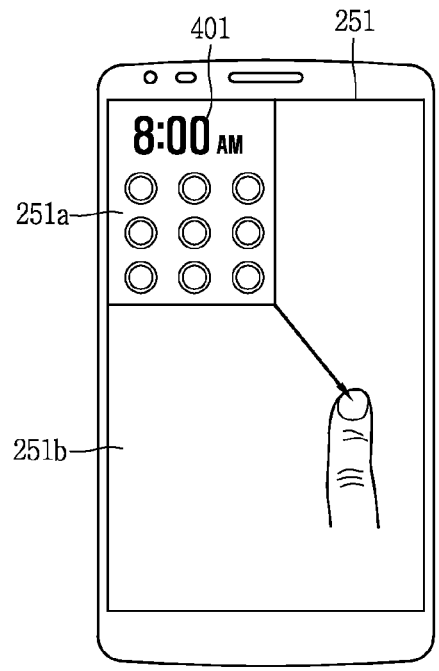
FIGS. 4(a) to 4(d) are conceptual views illustrating a method of controlling the screen of an external device using a touch input applied to the display unit as an example of the operation implemented according to an embodiment of the present invention.

Accordingly, as illustrated in FIG. 4(a), a lock screen 401 for the connected external device is displayed in a predetermined region, for example, an upper left region 251a of the display unit 151. In addition, the inactive state of the other region 251b continuously maintains.

A plurality of image objects capable of entering a pattern for releasing the lock state of the external device may be displayed on the lock screen. When a pre-registered pattern using the plurality of image objects is entered in a lock screen displayed in the first region of the display unit 151 to release the lock state of the external device (for example, a touch start point and a touch end point for the plurality of image objects, and a path to connect them to each other match a pre-registered pattern), the controller 180 can switch the lock state of the external device to a release state.

Here, the controller 180 can change the display status and display range of the lock screen displayed in the first region based on a preset touch input. For such an example, the controller 180 can gradually change the size of an image corresponding to the screen information displayed in the first region in response to a touch started from one side of the first region being dragged in one direction (for example, a direction of being away from the first region). Next, the controller 180 can fix the image based on a position at which the touch is released.

Figure 4B:
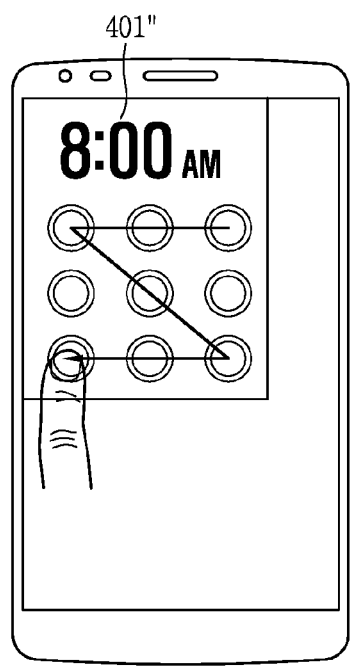

In other words, as illustrated in FIGS. 4(a) and 4(b), when a user applies a touch to one side (for example, edge) of the lock screen 401 using his or her finger (or stylus pen) and then drags it toward the second region 251b, a lock screen 401" in which its size is changed in proportion to the dragged distance may be displayed. According to an embodiment, the second region 251b that has been in an inactive state may be gradually activated along the drag path (namely, increasing the size of the first region 251a), or switched to a state that the entire display unit 151 is activated.

In addition, an image effect such as unfolding a rolled paper or an image effect such as stretching an elastic body like a rubber band may be applied to an image corresponding to the lock screen 401 according to the drag path. As the size of the first region 251a is increased as described above, the user may perform a pattern input for releasing the lock state of the external device on a larger-sized screen.

Figure 4C:
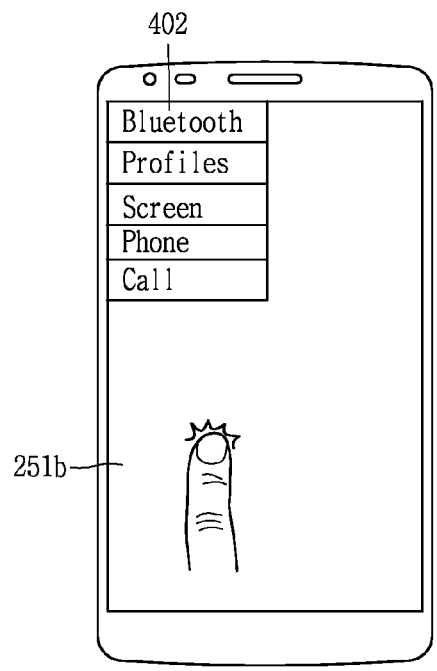
Figure 4D:
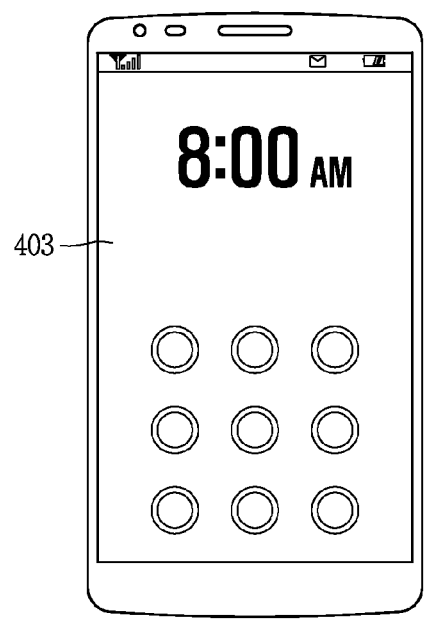

When a preset pattern is entered to the lock screen 401" to switch the lock state of the external device to a release state as illustrated in FIG. 4(b), the release screen 402 corresponding to the release may be displayed again in the predetermined first region 251a as illustrated in FIG. 4(c). Here, a screen displayed in the release state may be at least one of a home screen, an execution screen of an application, a menu screen, and a screen corresponding to an event occurred on the external device, and various types of screens may be displayed according to the setting or user's selection.

Further, when a touch input is applied to a region out of the first region in a state the lock screen displayed in the first region of the display unit 151 is changed to a screen corresponding to the release state, the controller 180 can stop displaying the release screen in the first region.

In other words, the controller 180 can recognize that a control operation executed through a touch input applied to the display unit 151 is changed from a "first mode" for controlling the display operation of the external device to a "second mode" for controlling the display operation of the mobile terminal. Here, it may be difficult to implement an operation corresponding to the first mode to be performed in the first region of the display unit 151 even in the second mode. In this instance, screen information displayed in the first region may be displayed in a floating window format.

Furthermore, the operation mode may be determined by a type of touch input applied to a region out of the first region in FIG. 4(c). For example, only screen information displayed in the first region disappears when a short touch is applied to the second region 251b, and it is changed to the second mode when a double short touch is applied to the second region 251b, and the screen information that has been previously displayed in the first region is displayed again when a double short touch is applied to the first region in the state of being switched to the second mode (FIG. 4(d)). Due to the operation mode, it may be possible to provide convenience capable of performing and checking the display operation of the mobile terminal 100 and external device on one screen.

When a touch input is applied to a region out of the first region, the entire display unit 151 of the mobile terminal 100 may be switched to an active state to display a lock screen, a home screen page or the like of the mobile terminal 100 other than the screen of the external device. Further, the foregoing series of processes of changing the display state and display range of a lock screen displayed in the first region based on a preset touch input may be applicable similarly to when a release screen is displayed in the first region.

Figure 5A:
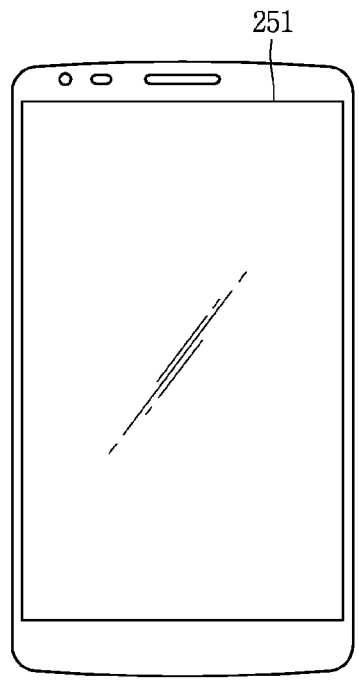
FIGS. 5A(a) to 5B(c) are conceptual views illustrating a method of displaying guide information with respect to virtual regions on the display unit as an example of the operation implemented according to an embodiment of the present invention.
Figure 5A:
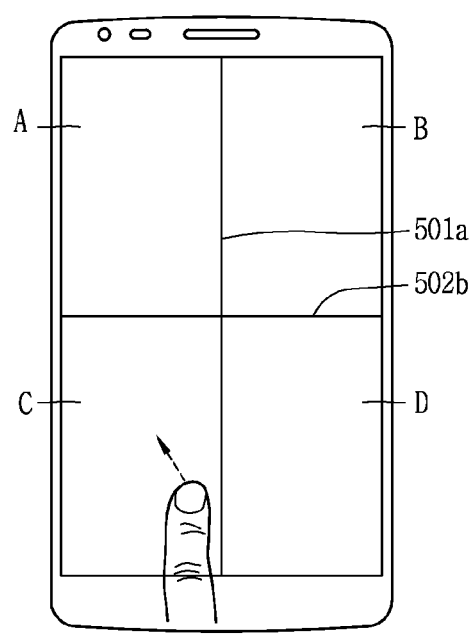
Figure 5A:
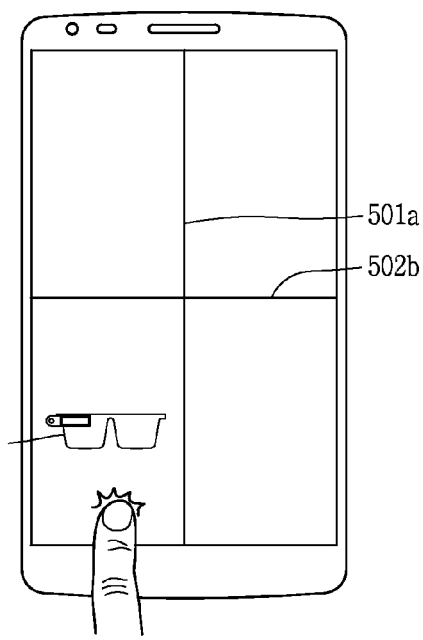
Figure 5A:
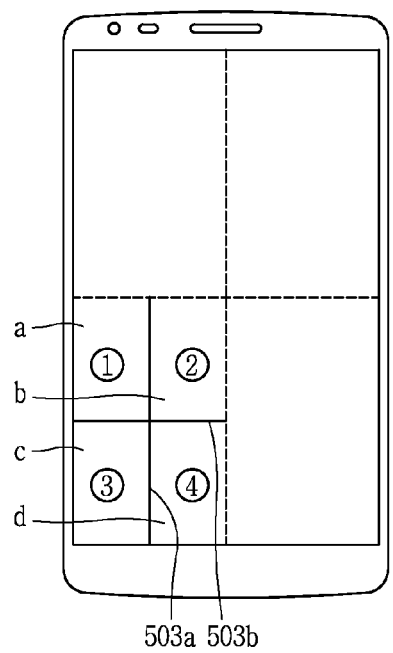
Figure 5B:
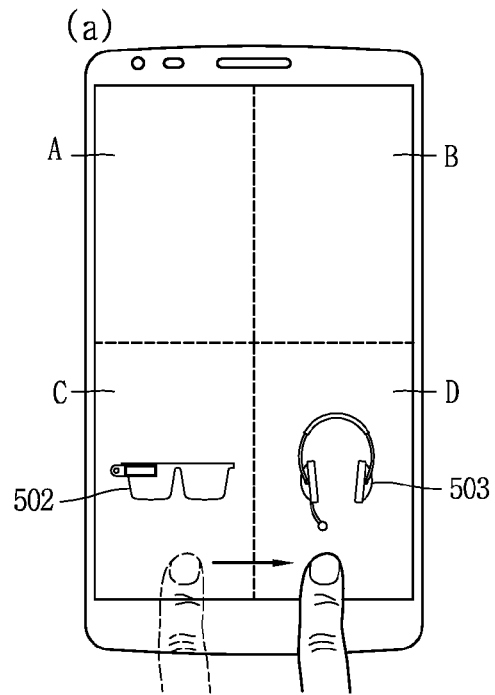
Figure 5B:
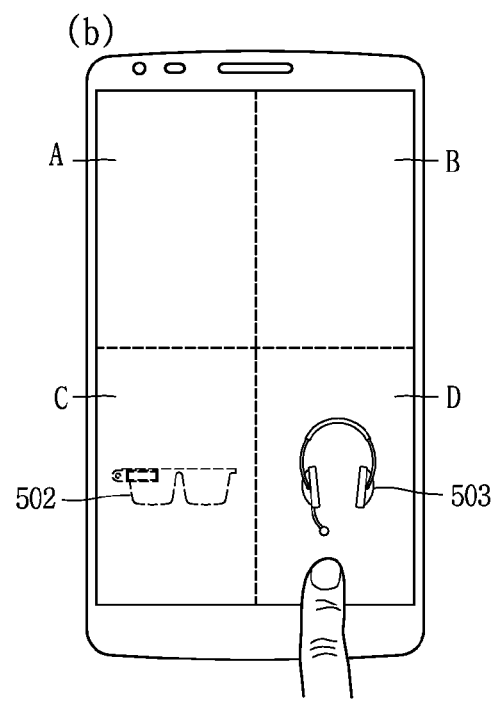
Figure 5B:
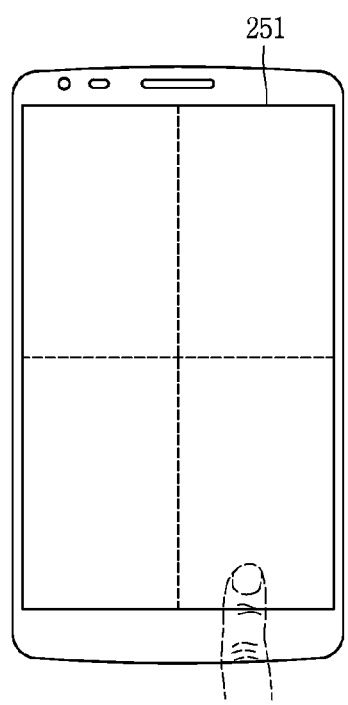
Figure 6A:
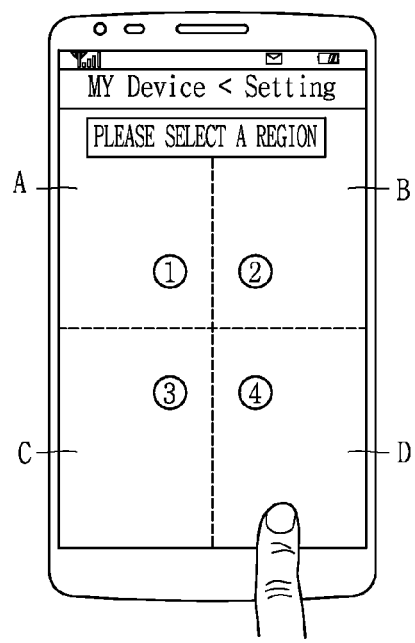
FIGS. 6(a) to 6(d) are conceptual views illustrating a method of registering an external device in virtual regions on the display unit as an example of the operation implemented according to an embodiment of the present invention.
Figure 6B:
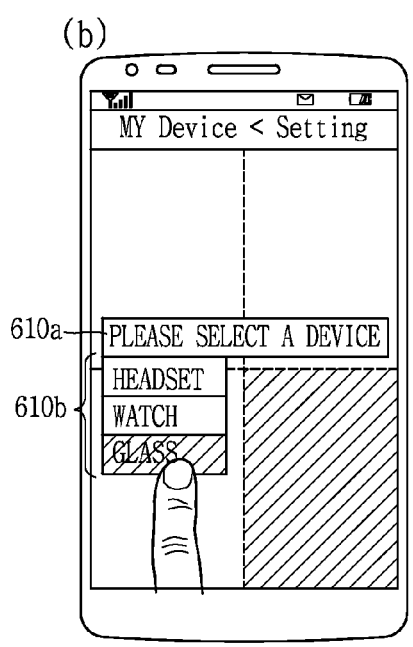
Figure 6C:
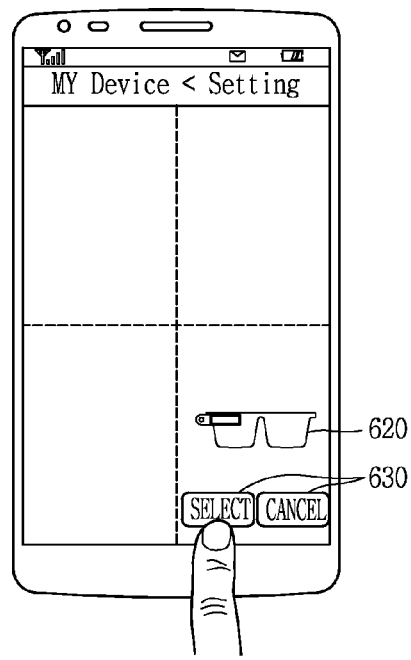
Figure 6D:
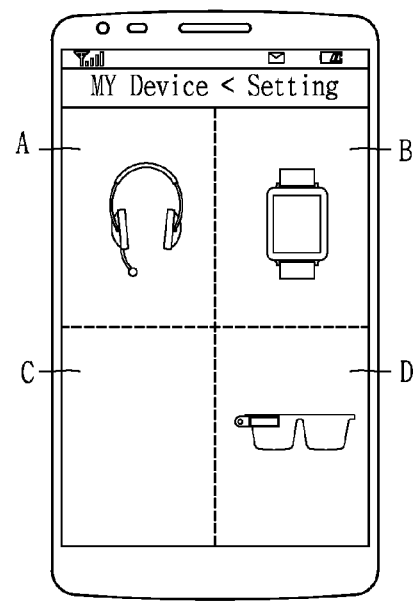

Next, FIGS. 5A and 5B are conceptual views illustrating a method of displaying guide information with respect to virtual regions on the display unit as an example of the operation implemented according to an embodiment of the present invention. According to an embodiment of the present invention, the display unit 151 is partitioned into a plurality of virtual regions in an inactive state. When a consecutive touch input, namely, "knock-on", is applied to any one of the plurality of partitioned regions, an external device corresponding to the region to which the touch input is applied can be recognized.

Here, different external devices may be registered to match the plurality of virtual regions, respectively, as described above. For example, as illustrated in FIGS. 5A(a) and 5A(b), a watch type terminal may be registered to match surface "A" and a glass type terminal may be registered to match surface "C" when the display unit 151 is deactivated. Accordingly, in order to turn on the status of a watch type terminal or switch it to a release state, a plurality of touch inputs should be performed on surface "A" and the user should recognize a device matching a location of the region in advance.

However, there is a limit in which the user always remember external devices matching a plurality of regions, respectively. Accordingly, when a preset touch gesture (for example, a proximity touch within a predetermined distance (several to several tens of millimeters)) is sensed on the display unit 151 when the display unit 151 is deactivated, the controller 180 can display guide information indicating an external device corresponding to a region corresponding to the touch gesture.

Here, the guide information may be a preset image, text or a user set image capable of identifying the external device. For example, when the external device matching a specific region is a glass type terminal, a "glass image" may correspond to this. Furthermore, the guide information may include a horizontal line 502*b* and a vertical line 501*a* crossing a central position of the display unit 151. Here, the guide information may be displayed with a black-and-white or dotted line, and when the guide information is an object image, it may be shown in the form of displaying only an outside of the object.

Furthermore, the controller 180 can display different guide information according to a time sequence based on touch gesture applied to the display unit 151. For example, as illustrated in FIG. 5A(b), when a proximity touch gesture is sensed on the display unit 151 in an inactive state, lines 502*b*, 501*a* partitioning virtual regions are shown, and when the proximity touch gesture is maintained for a preset period of time in a specific region among them, an image of the external device corresponding to the relevant region ("C"), namely, a thumbnail image 502 of the glass type terminal, is displayed.

Next, when a touch down event occurrence is sensed in the relevant region ("C"), the controller partitions the relevant region into a plurality of sub-regions, and displays guide information (for example, horizontal and vertical lines 503*b*, 503*a*) illustrating the partitioned sub-regions. Here, the controller 180 recognizes the touch as a confirmation of an external device corresponding to the relevant region ("C"), thus not allowing it to be contained in the foregoing plurality of touch inputs. In other words, the controller 180 processes a touch corresponding to the touch down event and the foregoing plurality of touch inputs in a distinguished manner.

When a plurality of touch inputs applied to a plurality of sub-regions (a, b, c, d) partitioned in the relevant region ("C") in a preset sequence (for example, ②,③,①,④) match a pre-registered pattern, a lock state of the glass type terminal is switched to a release state. Furthermore, the foregoing guide information may be also output along with voice guide or only with the voice guide. For example, when a users' finger (or stylus pen) comes close to region "C" in FIG. 5A(b), a guide voice such as "Would you release the glass" may be output.

As illustrated in FIG. 5B, when a user's touch gesture moves to another region when guide information capable of identifying an external device corresponding to a specific region (for example, region "C"), for example, an image 502 of the glass type terminal is displayed on the display unit 151 in an inactive state, the guide information may vary to correspond to the moved region. For example, as illustrated in FIG. 5B(b), as the user's touch gesture moves from region "C" to region "D", new guide information, namely, a Bluetooth headset image 503 may be shown in region "D". In this state, when a touch-up event for the proximity touch gesture occurs, the display of the guide information 502, 503 disappears as shown in FIG. 5B(c).

Further, when guide information is displayed on the display unit 151 with only a proximity touch gesture, the battery consumption increases, thus it may be possible to implement that guide information is displayed only while pressing a specific key (or subsequent to a starting gesture) or change whether or not to display guide information through the user's setting. Thus, the user may view guide information displayed on the display unit 151 and easily understand that an external device for releasing the lock state matches which region thereof, and a plurality of touch inputs are entered to which regions.

Next, FIG. 6 is a conceptual view illustrating a method of registering an external device in virtual regions on the display unit as an example of the operation implemented according to an embodiment of the present invention. As described above, different external devices may match virtual regions, respectively, partitioned on the display unit 151 in an inactive state. Thus, external devices corresponding to the plurality of partitioned regions may be set or changed by a user input.

Specifically, referring to FIG. 6 for example, when entering a "knock-on setting mode", a plurality of regions are shown, and guide information (for example, "Please select a region") for guiding to select a "specific region" is displayed as illustrated in FIG. 6(*a*). When a user applies a touch to region "D", a selection display (for example, shading effect) is shown, and guide information 610*a* (for example, "Please select a device") for guiding the selection of a "device" and a popup menu window 610*b* are displayed as illustrated in FIG. 6(*b*). A plurality of selectable external devices (for example, a headset, a watch, a glass, etc.) linked to the mobile terminal 100 are displayed in a text format on the popup menu window 610*b*.

When "glass" is selected on the popup menu window 610*b*, the popup menu window 610*b* disappears, and an image 620 of the selected external device and an icon 630 for checking the selection are displayed in the selected region ("D") as illustrated in FIG. 6(*c*). When a touch is applied to the icon "select", the controller 180 sets the "glass" to an external device matching region "D". When the setting is completed, the images of external devices matching each region may be displayed in the corresponding regions, respectively, thereby allowing the user to check them as illustrated in FIG. 6(*d*).

Further, when an external device matching a specific region is set, an operation pattern for switching the lock state of the external device to a release state is registered. The operation pattern is formed by taps hitting the terminal a plural number of times, and more specifically, formed by sequentially connecting the tap positions of the taps. For example, tap positions due to four taps may be set to an operation pattern for sequentially foaming the vertices of alphabet capital letter "N".

The controller 180 can partition the entire region of the display unit 151 into a plurality of regions, and allow the user to set an operation pattern using the partitioned regions. For example, when the set password is "3142", the controller 180 divides the display unit 151 based on the highest numeral ("4") among the entered numerals. For example, as illustrated in FIG. 5A(d), the controller 180 can divide a specific region of the display unit 151 into four quadrants. Then, identification numbers may be given to the four quadrants sequentially from the upper left portion (for example, from a first quadrant to a fourth quadrant). Then, the controller 180 can set a first tap through a fourth tap applied to the third, the first, the fourth and the second quadrant to an operation pattern. Accordingly, an operation pattern forming the vertices of alphabet capital letter "N".

Furthermore, in the "knock-on setting mode", a password for the mobile terminal 100 may be set to match a specific region, and a password setting for the external device and a password setting for the mobile terminal 100 may be processed in a distinguished manner. In this instance, an input for selecting either one of a "body mode" and an "external device mode" may be performed prior to performing the foregoing step S310 in FIG. 3. The input may be a gesture operation (for example, a starting gesture for covering the entire display unit 151 for a preset period of time using a palm) to perform the "external device mode".

Figure 7A:
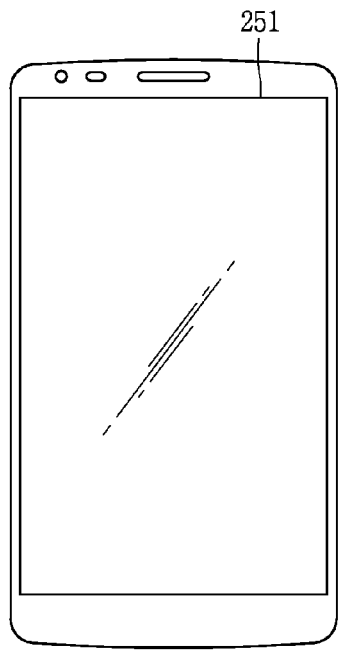
FIGS. 7A(a) to 7B(d) are conceptual views illustrating a method of releasing a lock state of an external device using a touch input applied to the display unit as an example of the operation implemented according to an embodiment of the present invention.
Figure 7A:
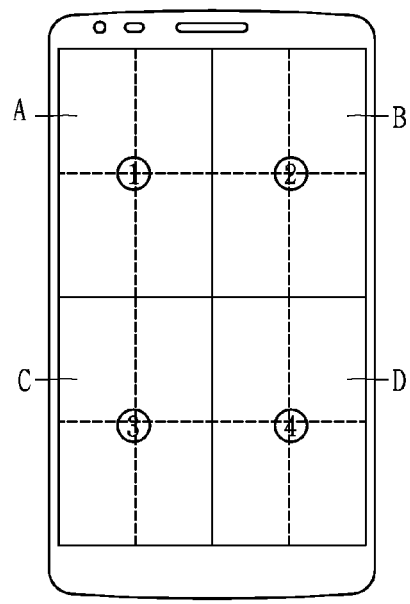
Figure 7A:
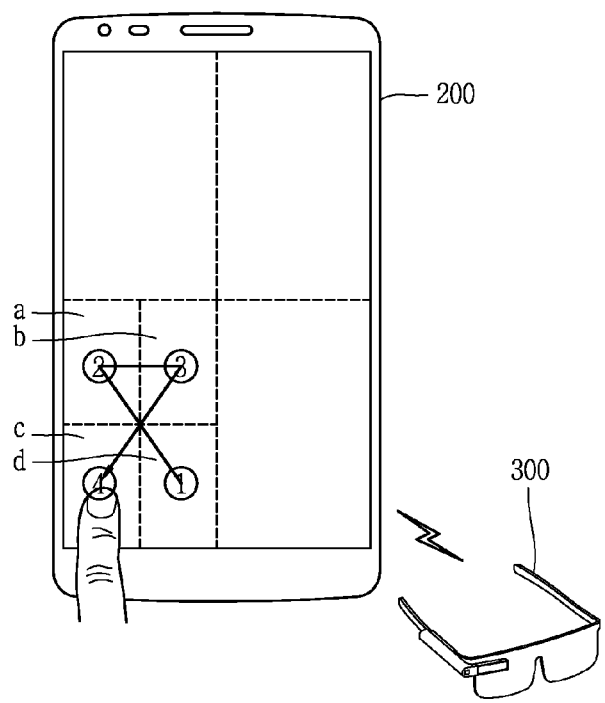
Figure 7A:
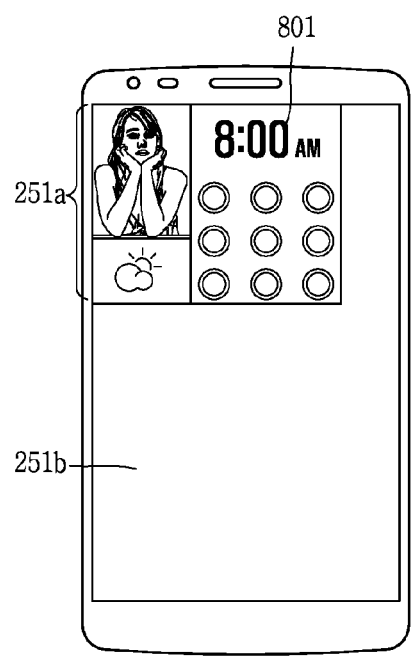
Figure 7B:
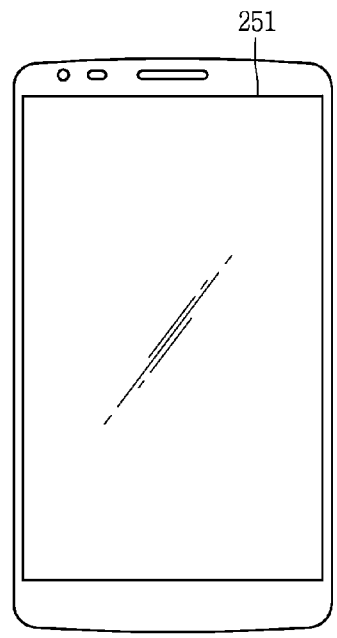
Figure 7B:
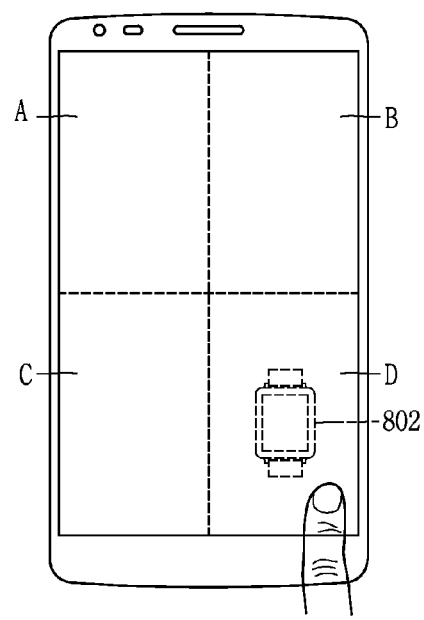
Figure 7B:
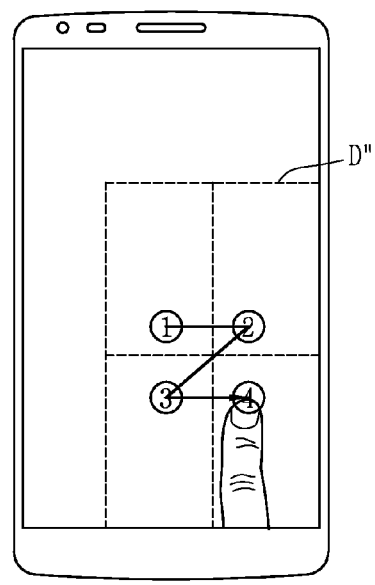
Figure 7B:
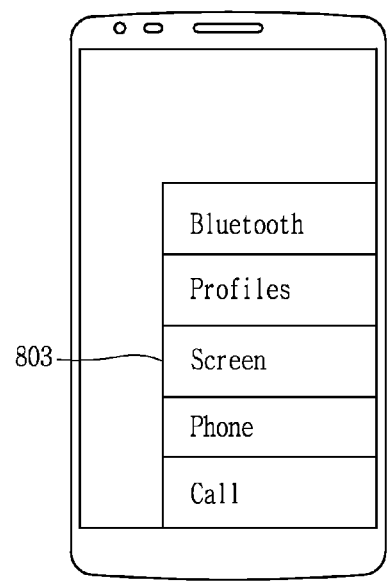

FIGS. 7A and 7B are conceptual views illustrating a method of releasing a lock state of an external device using a touch input applied to the display unit as an example of the operation implemented according to an embodiment of the present invention. As illustrated in FIGS. 7A(a) and 7A(b), a plurality of virtual regions (A,B, C, D) on the display unit 151 in an inactive state may include a plurality of sub-regions, respectively. For example, sub-regions partitioned again into four quadrants may be generated within region "A". Accordingly, the user may perform taps in a sequence corresponding to a preset pattern in the plurality of sub-regions partitioned within a specific region ("C"), for example, taps in the sequence of ①,②,③,④ within the region ("C"). Thus, the mobile terminal 100 may include a sensing unit for sensing a tap hitting the body when the display unit 151 is deactivated.

Here, the preset pattern may be defined by sequentially connecting a plurality of touch inputs applied to a specific region in a predetermined sequence. In other words, in FIG. 7A(c), a plurality of touch inputs applied to region "C" may be connected according to a touched sequence, thereby recognizing an operation pattern forming each vertex of symbol "X".

The controller 180 can switch a lock state of the external device corresponding to the selected specific region to a release state in response to a plurality of touch inputs sequentially applied according to a preset sequence (for example, ①,②,③,④) to at least one sub-region corresponding to a preset pattern among a plurality of sub-regions (for example, "a, b, c, d") contained in the selected specific region (for example, "C").

For example, the controller 180 recognizes an external device, for example, watch type terminal 300, corresponding to region "C", and transmits a wireless signal for switching a lock state of the recognized watch type terminal 300 to a release state through the wireless communication unit 110 as illustrated in FIG. 7A(c). Then, as described above, a release screen 801 corresponding to the release state is received from the watch type terminal 300, and displayed in the first region 251a of the display unit 151. Unless a touch input is applied thereto for a preset period of time, the release screen 801 displayed in the first region 251a disappears from the display unit 151, and the first region 251a is switched to an inactive state again.

Further, unless an operation pattern applied to a specific region (sequentially touching sub-regions according to a preset sequence in the selected specific region) is identical to a preset password, the first region 251a is not switched to an active state. In this instance, the controller 180 can output voice guide indicating that the password does not match the preset password through the audio output unit 152. However, even in this instance, the recognized external device may be switched to an "on" state, namely, a state that the display is activated.

Also, when a specific operation pattern is drawn within the selected specific region, there may be an inconvenience because there is an insufficient region for drawing a pattern. Accordingly, at least one of the location and size of a plurality of partitioned regions on the display unit 151 may vary according to a touch position at which the plurality of touch inputs are sensed on the display unit 151. For such an example, as illustrated in FIG. 7B, the mobile terminal 100 may set a touch region for recognizing an external device that performs the control and a touch region for switching a lock state of the recognized external device to a release state to be different from each other.

Specifically, as illustrated in FIGS. 7B(a) and 7B(b), a touch applied to a specific region ("D") among the virtual regions (A, B, C, D) when the display unit 151 is deactivated is recognized as a touch input for selecting an external device to be controlled. In other words, the touch input recognized herein is not contained in the plurality of touch inputs that have been described above or will be described later. Thus, when a short touch is applied to the specific region ("D"), the corresponding external device (for example, "watch type terminal") may be recognized to display an image 802 indicating the recognized external device in the relevant region ("D").

When an external device is recognized as described above, the controller 180 can newly configure the initially partitioned virtual regions with virtual sub-regions for the plurality of touch inputs in association with the recognized external device. In other words, as illustrated in FIG. 7B(c), the sub-regions are partitioned with a large size out of the relevant region ("D'"). Here, it is illustrated an example in which sub-regions in the selected region "D''" is partitioned based on the initial location of the region "D"), but the present invention is not limited to this. For example, the sub-regions of the region "D''" may be partitioned over the entire display unit 151 or partitioned in a predetermined region (for example, a central region of the display unit).

Further, according to another example, the location or size disposed with virtual regions or virtual sub-regions may vary according to a user's location or posture. For example, when the user performs a plurality of touch inputs using one hand touch while holding the mobile terminal 100 with his or her left hand, the foregoing virtual regions and sub-regions within each region may be sequentially generated within a region with which the user's left thumb is brought into contact. Similarly, when the user performs a plurality of touch inputs using one hand touch while holding the mobile terminal 100 with his or her right hand, the foregoing virtual regions and sub-regions within each region may be sequentially generated within a region with which the user's right thumb is brought into contact. Accordingly, the user can perform a connection to an external device and a release of the lock state of the external device, thereby enhancing the user's convenience.

Further, in order to sense a plurality of touch inputs through the sensing unit 140 when the display unit 151 is deactivated, a touch sensor should be active even when the display unit 151 is deactivated, there by recognizing the touch inputs. When the sensing unit 140 corresponds to the touch sensor, the sensing unit 140 may sense a "knock-on" in different ways according to whether or not the display unit 151 is activated.

For example, the display unit 151 is activated, the touch sensor may execute an active mode for maintaining an active state (including a case of switching between an active state and an inactive state for a short period of time to the extent to be seen as being substantially activated. On the contrary, when the display unit 151 is deactivated, a doze mode in which an active state and an inactive state are switched for a preset period of time may be performed to reduce battery consumption. In other words, when the display unit 151 is deactivated, the touch sensor may execute the doze mode to be active for each preset period of time.

Further, as the period of time of activating the touch sensor decreases, the speed for sensing a "knock-on" applied to the display unit 151 increases, but accordingly the power consumed by the sensing unit 140 increases. On the contrary, as the period of time of activating the touch sensor increases, the power consumed by the sensing unit 140 decreases, but accordingly the speed for sensing a touch applied to the display unit 151 decreases.

Consequently, the preset period of time may be set to be fast to the extent that the sensing speed cannot not be recognized by the user when sensing a touch applied to the display unit 151 as well as to enhance the efficiency of power consumption. For example, the preset period of time may be set such a manner that the touch sensor is activated 30 times per second (30 Hz). It may correspond to a minimum current level capable of recognizing a touch when the display unit 151 is deactivated.

Further, the touch sensor may execute a doze mode when the display unit 151 is deactivated, but execute the active mode when a first tap is applied to the display unit 151. In other words, when determined that a tap is applied when the display unit 151 is deactivated, the touch sensor may execute an active mode to more accurately sense a tap to be applied afterwards. For example, when the active mode is executed, the touch sensor may be set to be active approximately 120 times per second (120 Hz).

Further, when a second tap is not sensed within a reference period of time from a time point at which the first tap is applied, the touch sensor may switch the active mode to a doze mode. It is because a user's unintentional tap has occurred to prevent a malfunction in the terminal from being generated. Furthermore, according to an embodiment of the present invention, only when at least two or more (or a plurality of) taps are consecutively applied within at least a limited period of time, the controller 180 can determine whether or not an operation pattern for defining a release command is applied.

For example, a plurality of touch inputs applied to the display unit 151 in an inactive state satisfying the foregoing first condition denotes applying a "knock-on" in which the second tap is sensed within a limited period of time from a time point at which at least the first tap had been sensed to a specific region (a region matching an external device desired to control the operation) among the virtual regions partitioned on the display unit 151.

Furthermore, a plurality of touch inputs applied to the display unit 151 in an inactive state satisfying the foregoing first condition denotes sensing a "knock-on" in a specific region (a region matching an external device desired to control the operation) among the virtual regions partitioned on the display unit 151, and then applying taps to the virtual sub-regions in a sequence matching a preset operation pattern.

Further, if a plurality of touch inputs applied to the sub-regions of region "D" match a preset operation pattern in FIG. 7B(c), then the lock state of an external device corresponding to the selected region "D" is switched to a release state. Next, the relevant region "D" is switched to an active state, and predetermined screen information 803 corresponding to the release state (for example, a home screen page or a screen that has been most recently displayed prior to being switched to an inactive state is displayed.

Figure 8A:
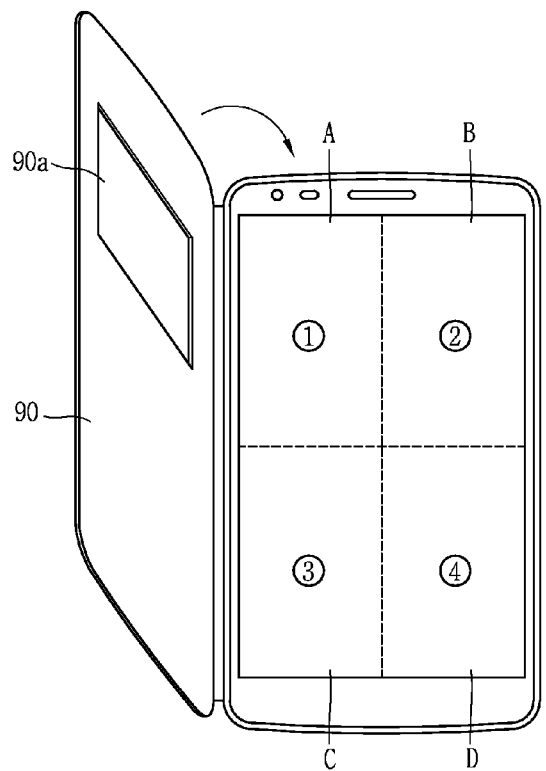
FIGS. 8A(a) to 8C(b) are conceptual views illustrating a method of changing a region to which a touch input is applied according to an open or closed state due to the cover as an example of the operation implemented according to an embodiment of the present invention.
Figure 8A:
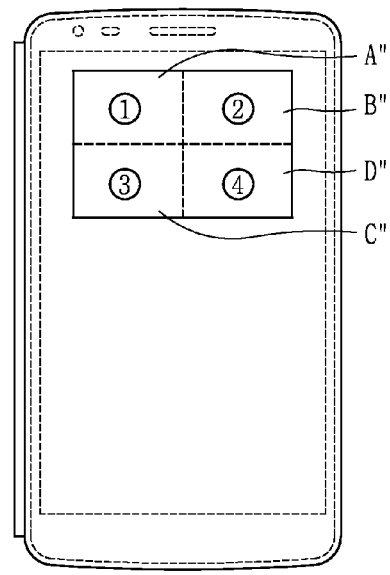
Figure 8B:
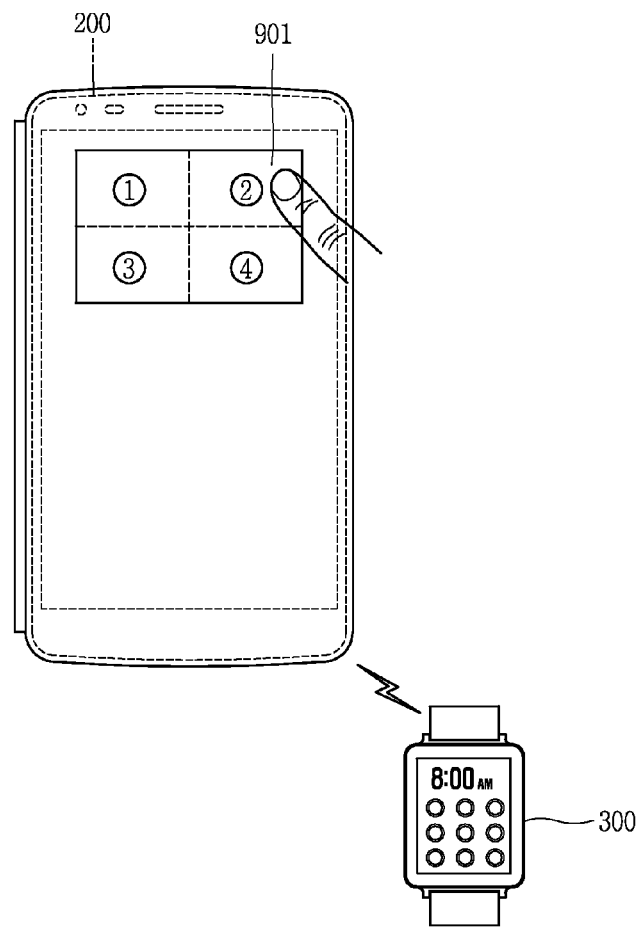
Figure 8B:
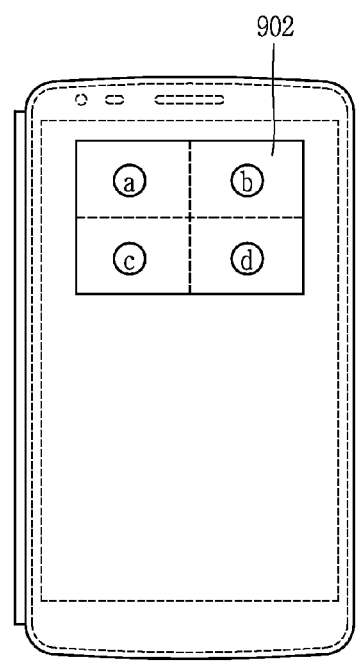
Figure 8C:
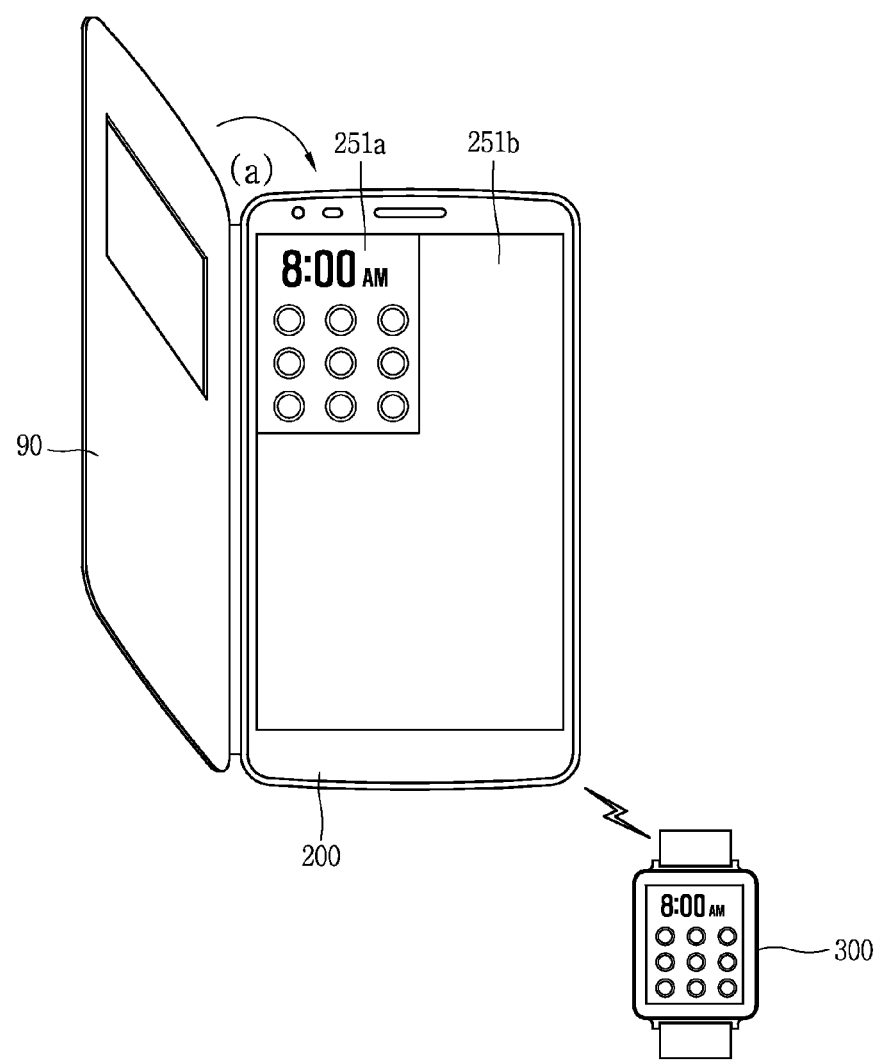
Figure 8C:
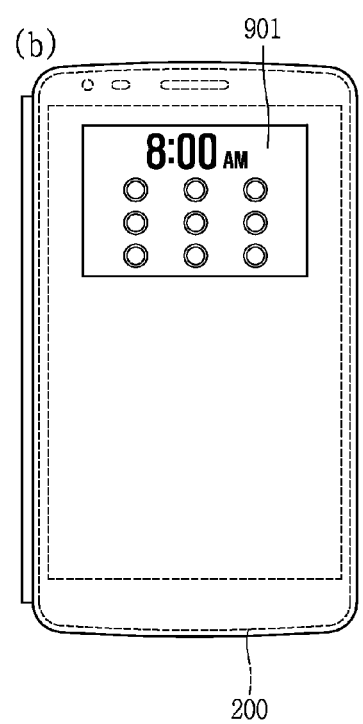

FIGS. 8A, 8B and 8C are conceptual views illustrating a method of changing a region to which a touch input is applied according to an open or closed state due to a cover when the cover is contained in a frame of the mobile terminal 100 as an example of the operation implemented according to an embodiment of the present invention.

Referring to FIG. 8A, a cover 90 according to an embodiment of the present invention may include a first member and a second member disposed at a front and a rear surface of the terminal body. Furthermore, the cover 90 may further include a connecting portion for connecting the first and the second member. The connecting portion may be formed to cover a lateral surface of the mobile terminal. Furthermore, a hole 90a having a predetermined shape (for example, a rectangle) is formed to always expose a specific region of the display unit 151 on a front surface of the cover 90.

Furthermore, the first and the second member may be formed with a flexible material. For example, the first and the second member, and the connecting portion may include at least one of polyurethane, PVC, bakelite, and cardboard. Furthermore, an outside line forming the hole 90a may be formed with a different material from that of the first member or the first member may be coated in a thicker manner than the surrounding thereof.

The mobile terminal 100 mounted with the cover 90 can control the display unit 151 to be activated by the movement of the first member. Furthermore, the cover 90 may include a magnet formed on the second member, and a sensor unit formed in one region of the mobile terminal body corresponding to the magnet in a closed state of the mobile terminal 100 to sense a magnetic change of the movement of the magnet. Furthermore, when including a plurality of magnets, they may be disposed to be separated from each other, and In this instance, the magnets may be disposed to be adjacent to each other in the second member or at least one of them may be disposed in one region of the first member.

The controller may sense switching from either one of a closed state and an open state of the cover 90 to the other one state based on a magnetic change sensed by the hole sensor according to the movement of the first member (moving toward the bottom surface).

An "open state" of the cover 90 denotes a state in which the entire display unit 151 is exposed as illustrated in the left side of FIG. 8A, and a "closed state" of the cover 90 denotes a state in which only a portion corresponding to the hole 90a of the cover 90 is exposed on the display unit 151 as illustrated in the right side of FIG. 8A. When the cover 90 is switched from an open state to a closed state or vice versa, the controller 180 can control the active state of the display unit 151 in a different manner and/or control the display unit 151 to display different screen information.

As illustrated in FIG. 8A, the virtual regions are partitioned based on the entire display unit 151 in the "open state" of the cover 90, and the virtual regions are partitioned based on only a portion corresponding to the hole 90a of the cover 90 on the display unit 151 in the "closed state" of the cover 90.

The controller 180 can control at least one of the size and location of a plurality of virtual regions to be varied in response to the cover being switched from either one of the closed state and open state to the other one.

Referring to FIG. 8B, virtual regions are partitioned on an exposed portion (hereinafter, referred to as a "window") corresponding to the hole 90a of the cover 90 on the display unit 151 in a "closed state" of the cover 90. When the user applies a "knock-on" to a specific region (②) 901, an access to an external device 300, for example, a watch type terminal, corresponding to the relevant region (②), is performed, and the watch type terminal 300 is switched to an "on" state.

Then, virtual regions partitioned on the window are changed to sub-regions (a, b, c, d) 902 for the selected specific region (②). In other words, the user first applies a "knock-on" to a specific region on the window to select an external device to be controlled, and then perform a plurality of touch inputs matching a preset operation pattern again within the window.

Furthermore, the controller may control at least one of the size and location of the first region in which a screen displayed on the external device is displayed to be varied in response to the cover being switched from either one of the closed state and open state to the other one. The controller 180 controls the activation of the display unit 151 according to the varied size and location of the first region.

Referring to FIG. 8C, when the screen information of an external device switched from a lock state to a release state is displayed in the first region 251b of the display unit 151 in an "open state" of the cover 90, when the cover 90 of the mobile terminal is switched to a "closed state", the screen information that has been displayed in the first region 251b is displayed on the window 901. In other words, the controller 180 switches the window 901 to an active state instead of the first region 251b on the display unit 151.

FIG. 9 is a conceptual view illustrating a method of releasing a lock state of the external device using another touch scheme applied to the display unit as an example of the operation implemented according to an embodiment of the present invention.

In the above, the examples of applying a "knock-on" to a specific region of the display unit 151 to control the operation state of an external device linked thereto has been described. In this instance, it is required to distinguish the "knock-on" from a "knock-on" for turning on the mobile terminal 100. Thus, as described above, it may be implemented to first perform an additional input (for example, starting gesture) for entering an external device mode, but in this instance, there is inconvenience that an additional operation should be performed.

In order to solve this, here, the external device is matched and registered to a line of the specific pattern without matching the specific region to the external device. Here, there is no limit in the lines of the specific pattern. In other words, it may be any line that can be connected with one brush drawing. For example, a specific alphabet, a specific symbol, a numeral, or the like may be a line of the specific pattern. The line of the specific pattern may be previously determined as a default (for example, a line with a specific pattern can be previously determined for each wearable device linked to the mobile terminal 100) or changed by a user setting.

More specifically, when a touch line having a pre-registered shape is applied to the display unit 151 when the display unit 151 is deactivated, the controller 180 can recognize an external device corresponding to the touch line. Subsequently, when a plurality of touch inputs consecutively applied to the display unit 151 correspond to the foregoing criteria (first criteria), the lock state of the recognized external device may be switched to a lock state.

Figure 9A:
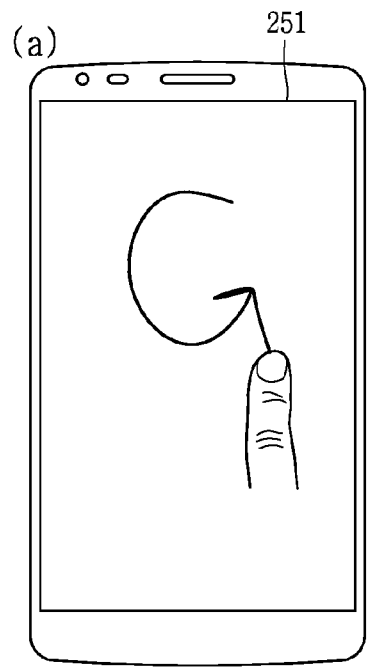
FIGS. 9(a) to 9(c) are conceptual views illustrating a method of releasing a lock state of the external device using another touch scheme applied to the display unit as an example of the operation implemented according to an embodiment of the present invention.
Figure 9B:
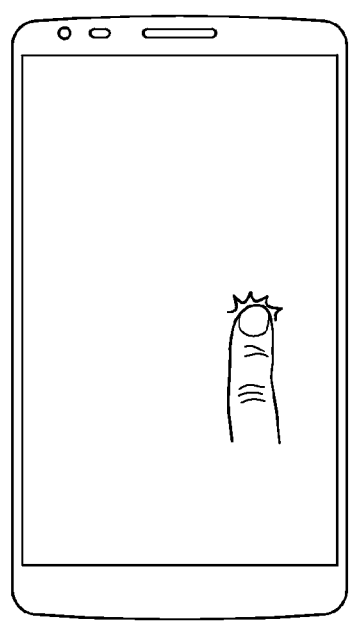
Figure 9C:
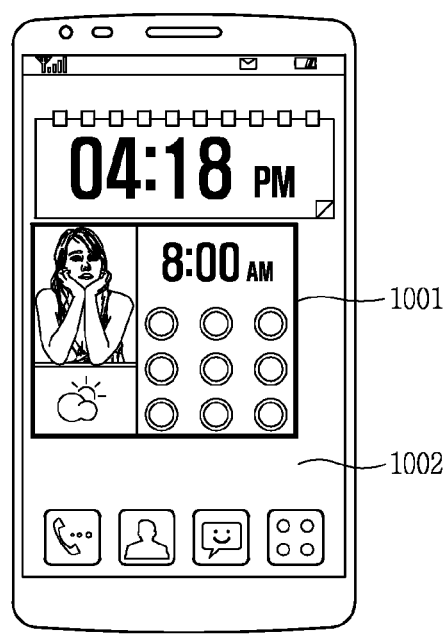

For example, as illustrated in FIG. 9, when alphabet "G" is matched and registered to a glass type terminal in the mobile terminal 100, a user may draw alphabet "G" using his or her hand or stylus pen and then apply an "knock-on" when the display unit 151 is deactivated as illustrated in FIGS. 9(a) and 9(b). In addition, there is no limit in a region on which alphabet "G" is drawn or a region to which a "knock-on" is applied. Then, the controller 180 accesses a glass type terminal to receive screen information displayed on the glass type terminal, and display screen information 1001, for example, a lock screen, in the first region of the display unit 151. Here, as illustrated in FIG. 9(c), the mobile terminal 100 is also switched to an "on" state by the "knock-on" applied to the display unit 151 to display preset screen information (for example, a lock screen, a home screen page, etc.).

Furthermore, the screen information of a glass type terminal displayed in the first region may be allowed to disappear when a preset period of time has passed or when touching one position of a region out of the first region. Accordingly, the user may perform the control of the mobile terminal 100 subsequent to the control of the glass type terminal.

Further, when applying a line of the specific pattern and sensing a "knock-on" while registering the line of the specific pattern for an external device with the mobile terminal 100, a lock state of the relevant external device may be switched to a release state. In this instance, as illustrated in FIG. 9, the lock state of the corresponding external device may be switched to a release state only by drawing a line of the specific pattern and applying a "knock-on" to the display unit 151 in an inactive state.

Otherwise, as illustrated in FIG. 9, when applying a line of the specific pattern and then applying a plurality of touch inputs corresponding to a preset operation pattern to the virtual regions, it may be possible to release a lock state of the external device corresponding to the line of the specific pattern.

Specifically, when a preset touch line is applied to the display unit 151, the controller 180 can switch a lock state of the external device corresponding to the touch line to a release state in response to a plurality of touch inputs being sequentially applied in a consecutive manner according to a predetermined sequence to at least one region corresponding to a preset pattern among the plurality of regions (for example, the display unit 151 can be partitioned into four quadrants using a central position thereof as an intersection). Then, the controller can switch the first region of the display unit 151 to an active state to display screen information corresponding to the release state.

Further, FIG. 10 is a conceptual view illustrating a method of controlling "a plurality of external device screens" on one screen using a touch input applied to the display unit as an example of the operation implemented according to an embodiment of the present invention. As described above, the corresponding external device may be matched and registered to each of the partitioned virtual regions when the display unit 151 is deactivated. Here, the user may want to control a plurality of external devices matching each region.

For example, when the user wants to release the lock state of the glass type terminal and watch type terminal using the display unit of the mobile terminal 100, is the user is inconvenienced because he or she has to take out each device and push a specific key and activate the screen and enter each pattern. Furthermore, even subsequent to releasing the lock state, the user is inconvenienced because screen has to be manipulated on a separate terminal.

Accordingly, the controller 180 can sense a second touch line having a pre-registered shape being newly applied to a region out of the first region through the sensing unit 140 when first screen information corresponding to the release state of the external device is displayed in the first region of the display unit 151 as described above.

Figure 10A:
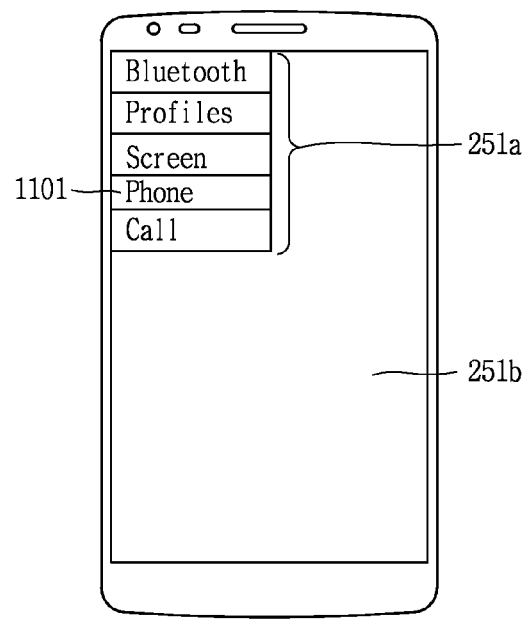
FIGS. 10(a) to 10(d) are conceptual views illustrating a method of controlling a plurality of external device screens using a touch input applied to the display unit as an example of the operation implemented according to an embodiment of the present invention.
Figure 10B:
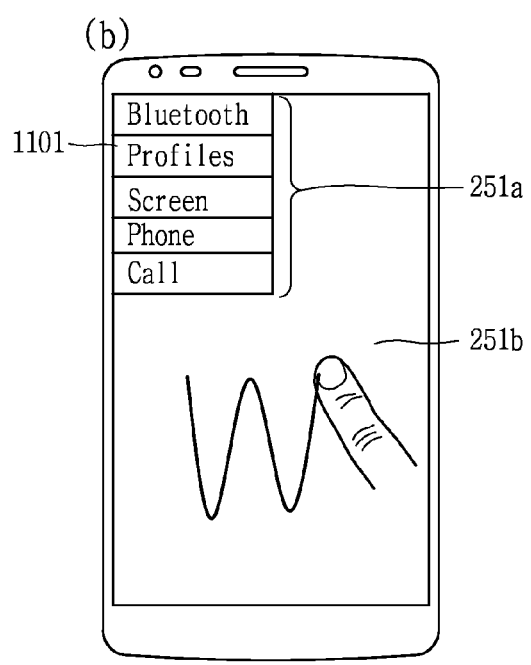

For example, when only the first region 251a is activated on the display unit 151 to display the release screen 1101 of the first external device (for example, glass type terminal) as illustrated in FIG. 10(a), the controller 180 can sense that a touch line having a preset pattern, for example, alphabet "W", applied to the second region 251b in an inactive state is drawn as illustrated in FIG. 10(b).

Figure 10C:
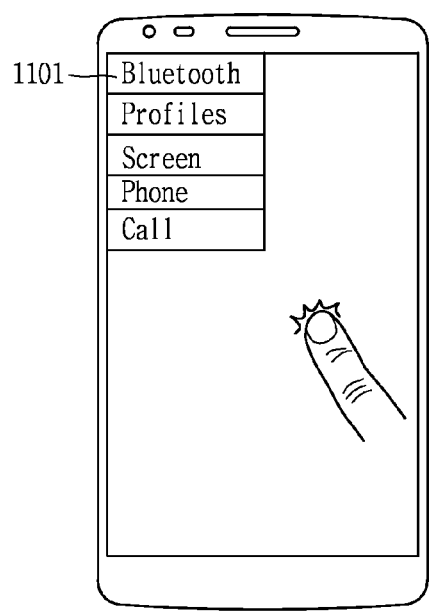
Figure 10D:
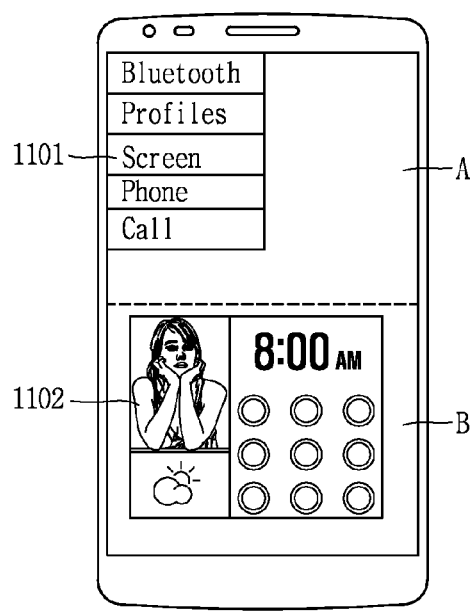

In this state, when a "knock-on" is subsequently sensed in the second region 251b as illustrated in FIG. 10(c), the controller recognizes a second external device (for example, watch type terminal) corresponding to the drawn touch line, and receives a lock screen from the second external device to display the received lock screen at a portion of the second region "B") as illustrated in FIG. 10(d).

In another example, when a touch line ("second touch line") having a preset pattern is applied to the second region 251b, the controller switches a lock state of the external device corresponding to the applied second touch line to a release state in response to a plurality of touch inputs being sequentially applied according to a preset sequence to at least one region corresponding to a preset pattern among a plurality of virtual regions (for example, a plurality of virtual regions can be generated in region "B" in FIG. 10(d).

Next, the controller 180 can activate a second region of the display unit 151 to display second screen information corresponding to the release state of the external device corresponding to the second touch line. The first and the second screen information displayed in each region are independently controlled, and synchronization with the corresponding external device is performed. For example, when a screen is changed on a glass type terminal, the first screen information is changed in a corresponding manner.

Thus, when a preset type of touch input (for example, short touch input) is applied to a region out of the region displayed with the first and the second screen information when the first screen information 1101 and second screen information 1102 are displayed in distinguished regions ("A", "B"), respectively, on the display unit 151, the controller 180 can stop displaying the first and the second screen information. In addition, the entire display unit 151 may be switched to an active state, and the lock screen or preset screen (a screen that has been most recently displayed prior to being switched to a home screen page or inactive state) of the mobile terminal 100 may be displayed thereon.

Consequently, the operation of a plurality of registered devices may be controlled in a simple manner on one mobile terminal. Further, when a preset touch input (for example, double short touch input) is applied to one region of the display unit within a predetermined period of time when the first and the second screen information disappear on the display unit 151 while the display unit 151 maintains an inactive state, the controller may control at least one of the first and the second screen information to be displayed again on the display unit 151. For example, the first and the second screen information may be displayed when a double short touch input is applied within a first period of time, and the screen information (for example, second screen information) that has been displayed lately may be displayed when a double short touch input is applied within a second period of time after the first period of time has passed.

As described above, according to a mobile terminal in accordance with an embodiment of the present invention and a control method thereof, it may be possible to release a lock state of another pre-registered terminal using a plurality of taps applied when the display unit is deactivated. Due to this, the lock state of another terminal may be released using a simple method of hitting the display unit, thereby providing user convenience. Furthermore, the user may release the lock state of another terminal in advance using a mobile terminal disclosed in the present invention, thus performing a quick link operation for a short period of time. In other words, the user may omit a complicated process for taking out another terminal to be used to turn on the display unit, and entering a password using a virtual keypad or the like to release a lock state.

In addition, the user may register different devices in advance to a plurality of regions, and then recognize a device registered to the relevant region using a plurality of different taps applied to a specific region, and release a lock state of the recognized device. Due to this, it may be possible to control the operation of a plurality of registered devices on one mobile terminal using a simple method. Furthermore, an input of a preset operation pattern may be required to connect to a registered device, thereby preventing any connection and use thereof by a third party during a theft of the device.

The foregoing present invention may be implemented as codes readable by a computer on a medium written by the program. The computer-readable media includes all types of recording devices in which data readable by a computer system can be stored. Examples of the computer-readable media may include HDD (Hard Disk Drive), SSD (Solid State Disk), SDD (Silicon Disk Drive), ROM, RAM, CD-ROM, a magnetic tape, a floppy disk, an optical data storage device, and the like, and also include a device implemented via a carrier wave (for example, transmission via the Internet). The computer may include the controller 180 of the terminal.

The present invention may be embodied in other specific forms without departing from the concept and essential characteristics thereof. The detailed description is, therefore, not to be construed as restrictive in all respects but considered as illustrative. The scope of the invention should be determined by reasonable interpretation of the appended claims and all changes that come within the equivalent scope of the invention are included in the scope of the invention.

What is claimed is:

1. A mobile terminal, comprising:
   a wireless communication unit configured to wirelessly communicate with an external device;
   a touch screen configured to sense a touch input, and switch between an active state and an inactive state, wherein the active state is in a screen on state of the touch screen and the inactive state is in a screen off state of the touch screen; and
   a controller configured to:
   recognize an external device corresponding to a touch region of a first touch input applied to the touch screen in the inactive state,
   receive a plurality of consecutive touch inputs applied to the touch region of the touch screen in the inactive state, and
   when the received touch inputs satisfy a preset criteria:
   unlock a locked state of the recognized external device,
   display an unlocked screen of the recognized external device on a first region of the inactivated touch screen in response to the unlocked state, and
   when the inactive state of the touch screen is switched to the active state, change the unlocked screen of the recognized external device to screen information of the mobile terminal.

2. The mobile terminal of claim 1, wherein the touch screen is partitioned into a plurality of virtual regions, and when a touch input is consecutively applied to any one of the plurality of partitioned virtual regions, the controller is further configured to:
   recognize a corresponding external device corresponding to the partitioned virtual region to which the touch input is applied, and display a lock screen corresponding to the locked state of the recognized external device in the first region of the touch screen.

3. The mobile terminal of claim 2, wherein the controller is further configured to:
activate the recognized external device,
display a lock screen of the activated external device in the first region of the touch screen, and
control the activated external terminal to release the locked state of the activated external device when the preset criteria corresponds to a pre-registered pattern input applied to the lock screen.

4. The mobile terminal of claim 3, wherein the controller is further configured to:
display a screen corresponding to the released state of the activated external device in the first region, and
when a touch input is applied to a region out of the first region, stop displaying the lock screen in the first region.

5. The mobile terminal of claim 2, wherein when a preset touch gesture is sensed on the touch screen in the inactive state, the controller is further configured to display guide information indicating the corresponding external device corresponding to a region corresponding to the preset touch gesture.

6. The mobile terminal of claim 5, wherein the controller is further configured to vary the guide information in response to the preset touch gesture moving to another region.

7. The mobile terminal of claim 2, wherein the controller is further configured to:
receive a user input identifying the corresponding external device corresponding to one of the plurality of partitioned virtual regions, and
set the identified external device to said one of the partitioned regions.

8. The mobile terminal of claim 1, wherein the controller is further configured to:
receive a touch and drag from one side of the first region in an expanding direction,
gradually change a size of the screen information displayed in the first region, and
fix the size of the screen information based on a position at which the touch and drag is released.

9. The mobile terminal of claim 2, wherein the touch screen includes a plurality of sub-regions for each of the plurality of partitioned virtual regions, and
wherein the controller is further configured to:
receive a plurality of touch inputs sequentially applied to a sub-region according to a preset pattern, and
control the external terminal corresponding the sub-region to release a locked state of the external device, when the preset pattern of touch inputs match a pre-determined password.

10. The mobile terminal of claim 9, wherein the preset pattern is defined by sequentially connecting the plurality of touch inputs according to a sequence of the touch inputs.

11. The mobile terminal of claim 9, wherein the controller is further configured to vary at least one of a location and size of the sub-regions based on a touch position of a touch input.

12. The mobile terminal of claim 2, further comprising:
a cover coupled to a terminal body and configured to open and close to cover and expose the touch screen,
wherein the controller is further configured to vary at least one of a size and location of the plurality of partitioned virtual regions in response to the cover being open or closed.

13. The mobile terminal of claim 12, wherein the cover includes an opening configured to expose a portion of the touch screen when the cover is closed,
wherein the plurality of partitioned virtual regions correspond to an exposed portion of the touch screen from the opening when the cover is closed,
when a first partitioned virtual region among the plurality of partitioned virtual regions is selected, the exposed portion of the touchscreen is partitioned into virtual regions corresponding to the external device indicated by the first region, and
wherein the plurality of touch inputs for releasing the locked state of the external terminal are received through the opening.

14. The mobile terminal of claim 1, wherein the controller is further configured to:
receive a first drag touch input having a specific shape, and
if the shape of the first drag touch input is matched to a shape of a registered pattern input:
recognize an external device corresponding to the shape of the registered pattern input, and
display a locked screen of the recognized external device on the first region of the inactivated touch screen.

15. The mobile terminal of claim 14, wherein the controller is further configured to:
receive a second drag touch input having a specific shape outside the first region where the touch screen is in the inactive state, and
if the shape of the second drag touch input is matched to a shape of another registered pattern input:
recognize another external device corresponding to the shape of the another registered pattern input, and
display a locked screen of the recognized another external device on a second region of the inactivated touch screen.

16. A method of controlling a mobile terminal, the method comprising:
recognizing an external device corresponding to a touch region of a first touch input applied to a touch screen of the mobile terminal in the inactive state, wherein the inactive state is in a screen off state of the touch screen;
receiving a plurality of consecutive touch inputs applied to the touch region of the touch screen in an inactive state; and
when the received touch inputs satisfy a preset criteria:
unlocking, via a controller of the mobile terminal, a locked state of the recognized external device;
displaying an unlocked screen of the recognized external device on a first region of the inactivated touch screen; and
when the inactive state of the touch screen is switched to the active state, changing the unlocked screen of the recognized external device to screen information of the mobile terminal.

17. The method of claim 16, wherein the touch screen is partitioned into a plurality of virtual regions, and
when a touch input is consecutively applied to any one of the plurality of partitioned virtual regions, the method further comprises:
recognizing a corresponding external device corresponding to the partitioned virtual region to which the touch input is applied; and displaying a lock screen corresponding to the locked state of the recognized external device in the first region of the touch screen.

18. The method of claim 17, further comprising:

activating the recognized external device;

displaying a lock screen of the activated external device in the first region of the touch screen; and controlling the activated external terminal to release the locked state of the activated external device when the preset criteria corresponds to a pre-registered pattern input applied to the lock screen.

19. The method of claim 18, further comprising:

displaying a screen corresponding to the released state of the activated external device in the first region; and when a touch input is applied to a region out of the first region, stop displaying the lock screen in the first region.

20. The method of claim 17, wherein when a preset touch gesture is sensed on the touch screen in the inactive state, the method further comprises displaying guide information indicating a corresponding external device corresponding to a region corresponding to the preset touch gesture.

* * * * *